United States Patent
Kraus

(10) Patent No.: US 10,058,037 B2
(45) Date of Patent: Aug. 28, 2018

(54) BALER AND METHOD FOR IMPROVED BALE HANDLING

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 966 days.

(21) Appl. No.: 14/525,529

(22) Filed: Oct. 28, 2014

(65) Prior Publication Data

US 2016/0113206 A1    Apr. 28, 2016

(51) Int. Cl.
| | | |
|---|---|---|
| B65B 25/02 | (2006.01) | |
| B65B 1/24 | (2006.01) | |
| A01F 15/07 | (2006.01) | |
| A01F 15/08 | (2006.01) | |
| A01F 15/04 | (2006.01) | |
| A01F 15/14 | (2006.01) | |

(52) U.S. Cl.
CPC ........ *A01F 15/0875* (2013.01); *A01F 15/042* (2013.01); *A01F 15/145* (2013.01); *A01F 2015/0735* (2013.01)

(58) Field of Classification Search
CPC ... B65B 5/06; B65B 1/24; B65B 25/02; A01F 15/04; A01F 15/0875; A01F 2015/0735
USPC .................................................. 53/469, 436
See application file for complete search history.

(56) References Cited

U.S. PATENT DOCUMENTS

| | | | |
|---|---|---|---|
| 4,224,780 A | * | 9/1980 | Rewitzer ............... B30B 9/3003 100/295 |
| 4,360,997 A | * | 11/1982 | Smith, Jr. ............. B65B 27/125 100/255 |
| 4,788,901 A | | 12/1988 | Klinner et al. |
| 5,009,062 A | | 4/1991 | Urich et al. |

(Continued)

FOREIGN PATENT DOCUMENTS

| | | |
|---|---|---|
| DE | 4021307 A1 | 1/1992 |
| DE | 4227145 A1 | 2/1994 |

(Continued)

OTHER PUBLICATIONS

European Patent Office, Extended European Search Report in Application No. 15191394.4 dated Mar. 30, 2016.

(Continued)

*Primary Examiner* — Gloria R Weeks
(74) *Attorney, Agent, or Firm* — Klintworth & Rozenblat IP LLP; Steven Wietrzny

(57) ABSTRACT

A baler and method are described for forming and wrapping bales of crop material. A baler may include a baling chamber, a crop-moving device for compressing crop material into a bale within the baling chamber, a bale chute oriented outside the baling chamber, and a wrap frame supported by the bale chute. Once formed within the baling chamber, the bales may be ejected from the baling chamber to the bale chute. A sheet of wrap material may be wrapped about the wrap frame, such that a sleeve of wrap material is formed from the sheet. The bale may be moved through the wrap frame, such that the bale engages the sleeve to pull the sleeve from the wrap frame and the bale is wrapped by the sleeve.

17 Claims, 18 Drawing Sheets

(56) References Cited

U.S. PATENT DOCUMENTS

| | | | |
|---|---|---|---|
| 5,175,981 A * | 1/1993 | Gombos | A01F 15/005 100/218 |
| 5,377,481 A | 1/1995 | Sibley et al. | |
| 5,531,061 A * | 7/1996 | Peterson | A01F 15/071 53/133.8 |
| 5,535,669 A | 7/1996 | Sibley et al. | |
| 5,553,446 A | 9/1996 | Sibley et al. | |
| 5,694,742 A * | 12/1997 | Elliott | B30B 9/301 100/218 |
| 5,701,723 A * | 12/1997 | Simpson | A01F 15/005 53/435 |
| 5,870,883 A | 2/1999 | Soderberg | |
| 5,950,410 A | 9/1999 | O'Brien et al. | |
| 8,833,247 B2 * | 9/2014 | Olander | A01F 15/005 100/35 |
| 9,844,187 B2 * | 12/2017 | Demon | A01F 15/0825 |
| 9,936,645 B2 * | 4/2018 | Keller | A01F 15/0875 |
| 2005/0055996 A1 | 3/2005 | Standlee | |
| 2012/0260609 A1 | 10/2012 | Kivela | |
| 2014/0041339 A1 * | 2/2014 | Borrelli | B65B 63/02 53/438 |
| 2016/0021825 A1 | 1/2016 | Keller et al. | |
| 2016/0021827 A1 | 1/2016 | Keller | |
| 2017/0265398 A1 * | 9/2017 | Retzlaff | A01F 15/0841 |

FOREIGN PATENT DOCUMENTS

| | | |
|---|---|---|
| DE | 19645640 A1 | 5/1997 |
| DE | 19855632 C1 | 3/2000 |
| EP | 1606991 B1 | 10/2007 |
| EP | 2796033 A1 | 10/2014 |
| WO | 2011142660 A1 | 11/2011 |
| WO | 2014072028 A1 | 5/2014 |

OTHER PUBLICATIONS

Internet Archive: Wayback Machine, "www.roundbalepress.com" Internet archive search, https://web.archive.org/web/20130616233506/http://roundbalepress.com/, dated Jun. 16, 2013.

Round Bale Press, Inc., YouTube video webpage, http://youtu.be/6wCJFnrXBmA, dated Mar. 31, 2014.

Tube•Line Manufacturing Inc., Balewrapper X2, Admitted Prior Art.

* cited by examiner

BALER AND METHOD FOR IMPROVED BALE HANDLING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to balers, including the formation, wrapping, and tying of finished bales.

BACKGROUND OF THE DISCLOSURE

In various agricultural and other settings, it may be useful to form bales from crop (or other plant) material, such as hay or corn stover. Various machines or mechanisms may be utilized to gather material (e.g., from a windrow along a field) and process it into bales. The formed bales may have various sizes and, in certain applications, may exhibit generally rectangular (i.e., or other) cross-sections. In order to create rectangular bales, for example, a square baler may travel along a windrow of cut crop material gathering the material into a baling chamber. A reciprocating plunger or other mechanisms may then compress the crop material into bales.

Known balers may include various knotter devices (or "knotters") that tie the bales by knotting twine into loops around the bales. In typical configurations, knotters and related twine-management devices may be arranged in a row extending laterally across the top (or the bottom) of a baling chamber. A loop of twine for each knotter of a baler may be fed by the twine-management devices to wrap around a bale as the bale is being formed. As the plunger moves the bale rearward through the baling chamber, the rearward movement of the bale through (and then out of) the baling chamber pulls twine from spools to accommodate the growing size of the bale. When the bale is completely formed, each knotter mechanism may then tie off its respective twine loop, in order to secure the twine on the bale. Such tied loops may help the bale retain its shape and general integrity once it is ejected from the baler.

Various issues may arise for known balers, as the balers handle (e.g., form, wrap, and eject) bales. Among these issues, the complexity, size, and weight of various knotters may complicate baler manufacturing, operation, and maintenance. For example, the relatively large size of typical knotters may limit the total number of knotters that may be provided for a given baling chamber. Because known knotters are typically configured to tie only one loop of twine at a time, the number of twine loops for tying bales from a given baling chamber may be limited accordingly. Further, because of the complexity of typical knotters, the knotters may also be subject to frequent breakage or damage. This may result in incomplete or inadequate tying of finished bales as well as significant down-time and maintenance expense for the affected baler.

SUMMARY OF THE DISCLOSURE

A baler and method are described for forming and wrapping bales of crop material.

According to one aspect of the disclosure, a baler may include a baling chamber, and a crop-moving device, such as a reciprocating plunger, for compressing crop material into a bale within the baling chamber. A bale chute may be oriented outside the baling chamber. A sheet of wrap material may be wrapped around a wrap frame supported by the bale chute in order to form a sleeve of the wrap material. Once formed within the baling chamber, the bales may be ejected from the baling chamber to the bale chute and moved through the wrap frame, in order to be wrapped with the sleeve.

In certain implementations, the baling chamber may be a blind baling chamber with a rear wall and a side member. The bales may be ejected from the baling chamber by moving the side member to urge the bales from the baling chamber towards the bale chute. Prior to ejection of the bale from the baling chamber, a gate of the baling chamber may be moved to provide an ejection passage for the bale from the baling chamber to the bale chute.

In certain embodiments, one bale chute may be oriented along a first side of the baling chamber and another bale chute may be oriented along a second side of the baling chamber. A side member of the baling chamber may be oriented at a second side of the baling chamber as the crop-moving device compresses crop material into a first bale, and may be moved toward the first side of the baling chamber to urge the formed first bale onto the one bale chute. With the side member oriented at the first side of the baling chamber, a second bale may be formed. The side member may then be moved toward the second side of the baling chamber to urge the formed second bale onto the other bale chute.

In certain embodiments, the sleeve of wrap material may be configured with an inlet end and an outlet end, with the outlet end being farther from the baling chamber than the inlet end. As the bale passes through the sleeve, a leading portion of the bale may engage the sleeve at the outlet end such that the bale pulls the wrap material away from the baling chamber. The portion of the wrap material that wraps the bale may be configured to be separated from the sleeve, such that when the bale is removed from the bale chute, the portion of the wrap material remains wrapped on the bale and the sleeve remains supported by the bale chute.

In certain embodiments, the baling chamber may include a moveable rear wall, with the crop-moving device being configured to compress crop material against the moveable rear wall to form a bale. During compression of the crop material, the rear wall may be moved based upon one or more of a predetermined compression distance for the crop material and a predetermined target pressure for the crop material.

According to another aspect of the disclosure, a baler may include a baling chamber with a side member configured to move laterally within the baling chamber. First and second bale chutes may be oriented outside the baling chamber along first and second lateral sides, respectively, of the baling chamber. One or more ejection actuators may be configured to eject formed bales onto the first and second bale chutes, respectively, by moving the side member from the second and first lateral sides of the baling chamber, respectively, towards the first and second lateral sides of the baling chamber, respectively.

In certain embodiments, a first wrapping device may be disposed along the first bale chute. The first wrapping device may include a support for holding a sleeve of wrap material at the first bale chute. As the first bale moves along the first bale chute, the first bale may pass through the sleeve of the wrap material, such that a portion of the wrap material wraps the first bale.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
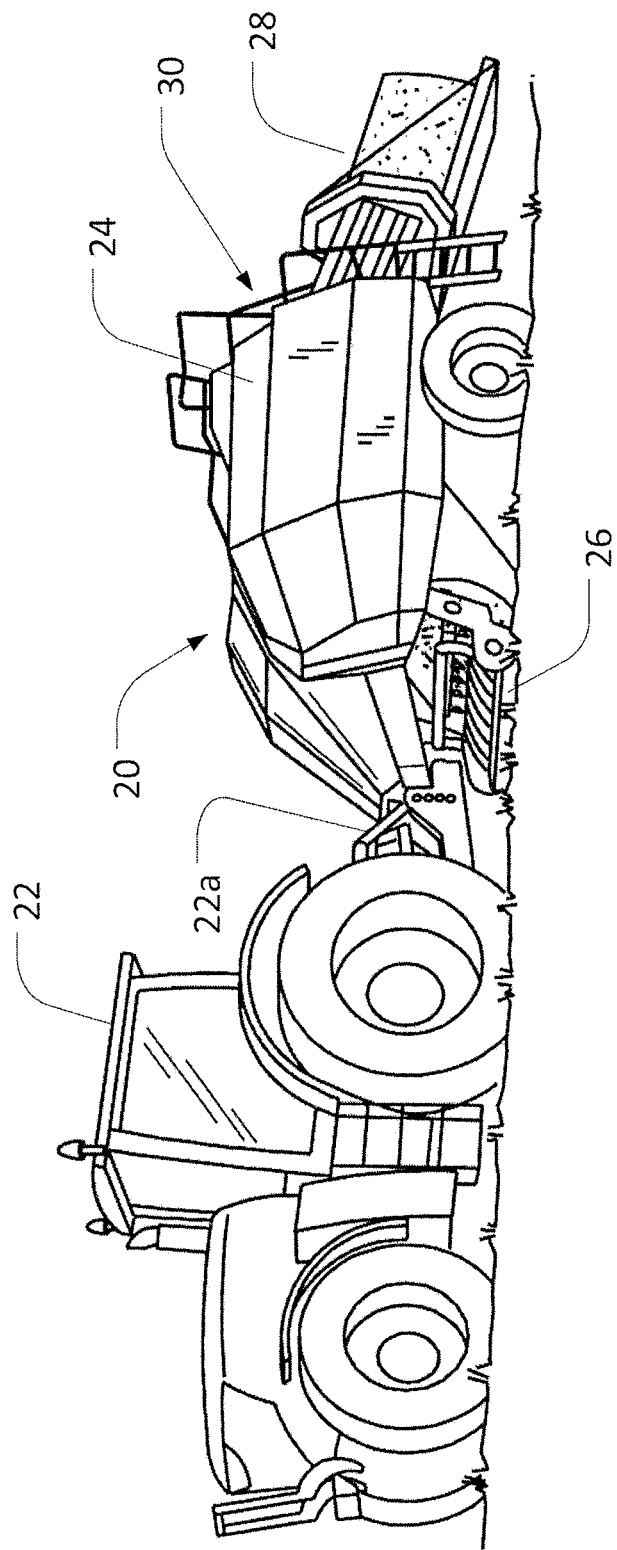
FIG. 1 is a perspective view of an example prior art baler towed by a work vehicle.

The following describes one or more example embodiments of the disclosed baler and related method, as shown in the accompanying figures of the drawings described briefly above. Various modifications to the example embodiments may be contemplated by one of skill in the art, including implementation of the disclosed method through a special-purpose computing system employing one or more processor devices and memory architectures.

As used herein, "wrap material" may indicate one of various types of materials utilized to hold bales of compressed plant matter together or to otherwise maintain the integrity (structural or otherwise) of the bales. Wrap material may include, for example, twine or similar material, net wrap, plastic or other sheeting (i.e., "sheet wrap"), banding, straps, composite rolls with various layers of vapor permeable, liquid impermeable, and other materials, and so on. In certain instances, wrap material may be provided in spools or rolls, including spools of twine, rolls of net wrap, rolls of plastic sheeting, and so on.

Also as used herein, "wrapping" a bale may include application of wrap material to a bale in various ways in order to hold the bale together or otherwise maintain the integrity of the bale. For example, a bale may be wrapped with twine by looping the twine around the bale and, in certain instances, knotting the loops. Likewise, a bale may be wrapped with net or sheet wrap by applying the net or sheet over outer portions of the bale. In certain instances, wrapping a bale may also include securing wrap material in place on the bale. For example, to secure wrap material to a bale, the wrap material may be looped over itself, knotted or tied, heat welded or sealed, sealed through vibration, shrunk in place, expanded, secured with clasps, and so on. A bale that has not been wrapped with wrap material at all may be viewed as an "unwrapped" bale. A bale that has been only partially wrapped with wrap material, such that further wrapping will be applied before the bale is ejected into a field (or elsewhere), may be viewed as a "partially unwrapped" bale.

As noted above, typical balers may wrap a bale with loops of twine as the bale is formed in the baling chamber. Once the bale is fully formed, knotters may knot the twine loops to secure the twine around the bale. Knotters may be distributed laterally across the width of the baling chamber, such that each knotter ties a single loop of twine around a formed bale.

Due to the relatively large size of known knotters, the total number of knotters that may be used for a particular baling chamber—and thereby the number of twine loops that may be tied for an associated bale—may be limited. Accordingly, typical balers may include only a limited number of knotters for each of the associated baling chambers. In combination with material-strength limitations, this may limit the binding force that may be applied to a bale with twine and knotters, which may in turn limit the amount of crop material that can be compressed into a particularly sized bale.

With typical baler designs, the complexity of knotters and of the operations they perform may also introduce complications. For example, knotters may tend to snag, jam, or break with some regularity as twine becomes tangled or snarled within the knotter (and related systems). This may result in downtime for the baler, as well as significant maintenance and replacement costs. Knotters may also be both heavy and expensive, which may contribute to increased baler weight and manufacturing cost.

The disclosed baler and baling method may address these and other issues. In certain embodiments, after a bale has been formed in a baling chamber, the bale may be ejected from the baling chamber onto a baling chute. In a square baler, for example, a reciprocating plunger may cyclically compress gathered crop material within the baling chamber to form a bale with a generally rectangular (e.g., square) cross section. The bale may then be ejected from the baling chamber to a bale chute, where the bale may be wrapped with wrap material before being ejected from the bale chute to the field.

In certain embodiments, the baling chamber of the baler may not include knotters or other wrapping (and tying) devices, such that bales ejected from the baling chamber may be unwrapped bales. One or more wrapping devices may be oriented about the bale chute to wrap a bale as the bale sits at (or moves across) the bale chute. In certain embodiments, bales ejected from the baling chamber may be partially unwrapped bales. For example, in certain embodiments, a formed bale may be partially wrapped with twine or other wrap material while still inside the baling chamber, then ejected onto the baling chute for further wrapping.

In certain embodiments, bale chutes may be oriented along one or more of the lateral sides of the baling chamber. For example, in a square baler with a plunger that reciprocates along a front-to-back path within the baling chamber (or with another crop-moving device), a single bale chute may be oriented along a lateral (i.e., right of left) side of the baling chamber. In other embodiments, a pair of bale chutes may be provided, one on each lateral side of the baling chamber. Once an unwrapped (or partially unwrapped) bale has been formed in the baling chamber by the plunger, an actuator may urge the bale laterally from the baling chamber to a particular bale chute for wrapping and ejection to the field. This may present a contrast to known balers, in which bales are generally extruded from an open rearward end of the baling chamber.

In certain embodiments, a sleeve of wrap material may be supported on (or about) a bale chute with one open end (i.e., an "inlet" end) of the sleeve oriented towards the baling chamber and one open end (i.e., an "outlet" end) of the sleeve oriented opposite the baling chamber from the inlet end. When the bale is moved out of the bale chamber to the bale chute, the bale may pass into the sleeve through the inlet end. When the bale exits the sleeve at the outlet end, a portion of the wrap material may be engaged by the bale, such that the portion of wrap material continues with (e.g., adhere to) the bale. In this way, when the bale is ejected from the bale chute to the field, the bale may be appropriately wrapped. A sleeve of plastic sheeting, for example, may be supported on a support frame on a bale chute such that a bale being ejected from the baling chamber passes into one opening of the sleeve. As the bale passes through the sleeve toward the outlet end a portion of the bale may engage a loose portion of the wrap material (e.g., a free edge of the wrap material at the outlet end of the sleeve) such that the plastic sheeting is pulled by the motion of the bale to appropriately wrap the bale. As the bale exits the sleeve, the plastic sheeting surrounding the bale may pull away from the larger sleeve (e.g., at a pre-existing perforation, at a cut formed by a cutting device (not shown), and so on) in order to remain wrapped around the bale.

Other wrap materials and wrap devices may also be possible. For example, rolls of net wrap or plastic sheeting may be rotated (or otherwise moved) around a bale at the bale chute (or elsewhere) such that the bale is wrapped with successive loops of the net wrap or plastic sheeting. Similarly, spools of twine may be provided at the bale chute (or elsewhere), in order to wrap the bale with loops of twine. As appropriate, these loops may then be tied with a knotter device or other mechanism.

In certain embodiments, a bale may be indexed along the bale chute as a wrapping device wraps successive loops of wrap material around the bale. This may result in a spiral of wrap material around the bale. For example, as a bale is pushed along a bale chute (e.g., by another bale being ejected from the baling chamber) a wrapping device may provide a continuous, looping feed of twine, net wrap, plastic sheeting, or other wrapping material. The movement of the bale past the wrapping device may accordingly cause a relatively opposite movement of this looping feed on the bale. In this way, as long as the indexing and looping feed continue, the bale may be wrapped with a spiral of the wrap material.

In certain embodiments, a side member of the baling chamber may be moved laterally in order to eject bales from the baling chamber to the bale chute. A moveable side wall of the baling chamber, for example, may be actuated by a hydraulic piston (or other actuator) in order to push, pull, or otherwise urge a bale from the baling chamber. Movement of a side member to eject bales from the baling chamber may also urge the bales through (or past) a particular wrapping device in order to facilitate wrapping of the bales at the bale chute. For example, a moveable side wall may urge a bale (directly or indirectly, including via another bale) to pass from a baling chamber onto a bale chute, then pass through a sleeve of wrap material that is supported on the bale chute.

In certain embodiments, a gate may be provided, which may open to allow passage of bales from the baling chamber to the bale chute. For example, a first side member of a baling chamber (e.g., another moveable side wall) may be lifted by a hydraulic cylinder (or other actuator) in order to permit a second side wall (e.g., as noted above) to push a bale out of the baling chamber.

In certain embodiments, a single side member may be used to separately urge bales into either of two (or more) bale chutes. For example, a baling chamber may include (or be otherwise associated with) a moveable side member, and a bale chute may be provided at each of two lateral sides of the baling chamber. With the side member (e.g., a moveable side wall) at a first side of the baling chamber, a first bale may be formed. The side member may then be moved from the first side of the baling chamber toward a second side of the baling chamber in order to urge the first bale onto a first of the bale chutes. The side member may then be maintained at the second side of the baling chamber while a second bale is formed, then moved back toward the first side of the baling chamber in order to urge the second bale onto a second of the bale chutes.

In certain embodiments, the baling chamber may be a blind baling chamber. For example, in a square baler with a reciprocating plunger at a rear wall of the baling chamber may be provided, against which the plunger may compress crop material to form a bale. As additional crop material is introduced for compression, the rear wall may be moved progressively rearward in the baling chamber (or otherwise away from the plunger) in order to accommodate the growing bale. In certain embodiments, the rear wall of a baling chamber may be moveable.

The position of a moveable rear wall of a baling chamber may be controlled in various ways during baling (and wrapping) operations. In certain implementations, a rear wall may be controlled by moving the rear wall a predetermined distance for each cycle of the plunger. For example, where the plunger compresses successive "flakes" of crop material into a forming bale, the rear wall may be moved a particular distance rearward (i.e., away from the plunger) for each flake. Because such a distance may correspond to a particular amount of compression of flakes of a nominal size, the distance may be viewed as a "compression distance." In order to ensure appropriate compression of the flakes, an appropriate compression distance may be smaller than the average thickness (front-to-back, with respect to the baling chamber) of the flakes.

In certain implementations, the position of the rear wall of the baling chamber may be controlled based upon a target pressure. For example, where the rear wall is actuated by a hydraulic cylinder, a hydraulic accumulator (or other device or system) may be utilized to maintain a particular target pressure for the cylinder. (It will be understood that such a target pressure may be part of a target pressure range.) An appropriate target pressure (or range) may, for example, correspond to a desired amount compression of the crop material for the forming bales.

In certain implementations, the position of the rear wall of the baling chamber may be controlled based upon both a predetermined compression (or other) distance and a predetermined pressure (or pressure range). For example, for each cycle of a reciprocating plunger the rear wall may be initially moved a predetermined compression distance. This may, for example, allow initial compression of flakes against a relatively rigid wall (i.e., the rear wall, as held in position based upon the compression distance). As the plunger advances (e.g., as a crank driving the plunger approaches an orientation with larger mechanical advantage), a predetermined target pressure may then be maintained at the rear wall, with the rear wall moving (e.g., rearward). as appropriate. to ensure appropriate resistive pressure to the plunger as the plunger advances. This may, for example, allow the flakes to be compressed by a particular amount, in order to form an appropriately dense bale.

Various example embodiments discussed below may include particular square balers. It will be understood, however, that the improvements disclosed herein may be utilized with respect to a variety of balers and baler types.

Referring now to FIG. 1, a large square baler 20 of known configuration is depicted. As the baler 20 moves across a field (e.g., as towed by the vehicle 22 via a connection 22a) and encounters a windrow or other arrangement of material (not shown), a pick-up assembly 26 may gather the material and move it into a housing 24 for processing into a bale 28. In certain configurations, a plunger (not shown in FIG. 1) may successively compress flakes of crop material within a baling chamber 30 until the bale 28 has been fully formed. Before the formed bale 28 is ejected from the rear of the housing 24, and while the bale 28 is still inside the baling chamber 30, the bale 28 may be wrapped with twine (or other material) and the twine tied by a knotter (not shown in FIG. 1).

Figure 2:
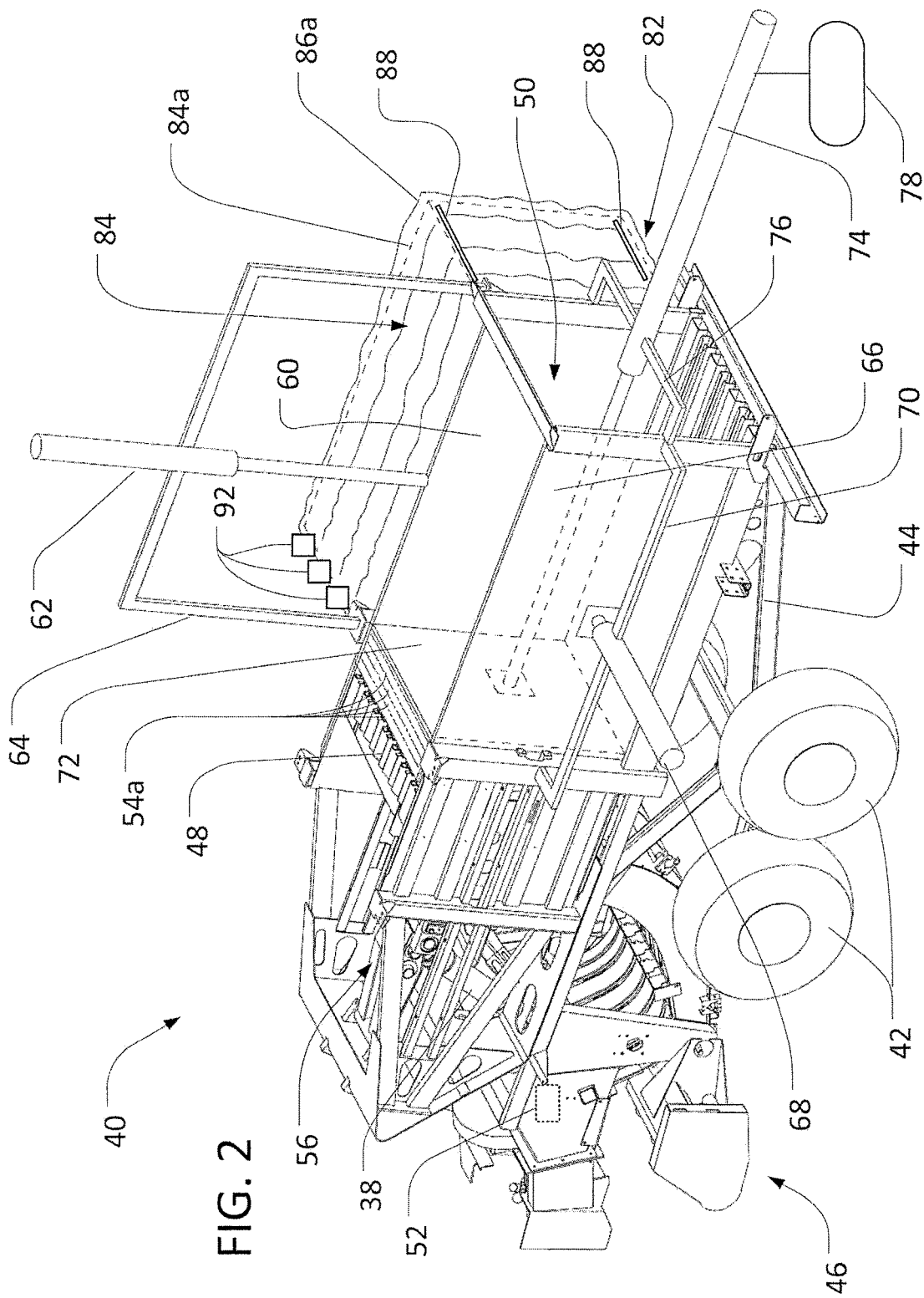
FIGS. 2-5 are perspective views depicting the formation and ejection of square bales by an example baler according to this disclosure.

Referring also to FIG. 2, an improved example baler 40 is depicted, the baler 40 being configured to eject formed bales to the side of the baler 40 as an alternative (or in addition) to ejecting formed bales from the back of the baler 40. (For clarity of presentation of various internal mechanisms, the housing of the baler 40 is not depicted in the various figures.) The baler 40 is generally supported for travel over a field by wheels 42 mounted to a chassis 44. A pick-up assembly 46 for gathering crop material from a field is provided, which may be similar to the pickup assembly 26. Crop material gathered by the pick-up assembly 46 is routed upward and rearward through the baler 40 and formed into generally rectangular flakes 54. The flakes 54 are then compressed within a baling chamber 50 by a reciprocating plunger 48 to form a bale.

Various embodiments discussed herein may utilize a reciprocating plunger, such as the plunger 48, to compress crop material within the relevant baling chamber. Other crop-moving devices may additionally (or alternatively) be utilized. For example, an auger (not shown) may be employed to feed crop material into a baling chamber and, in certain embodiments, compress the crop material into bales within the baling chamber.

The baler 40 (or other similar balers) may also include one or more controllers 52. The controllers 52 may be configured as computing devices with associated processor devices and memory architectures, as hydraulic, electrical or electro-hydraulic controllers, or otherwise. As such, the controllers 52 may be configured to execute various computational and control functionality with respect to the baler 40 (and other machinery). An example location for the controllers 52 is depicted in FIG. 2. It will be understood, however, that other locations are possible including other locations on the baler 40 or various remote locations (e.g., on a towing vehicle (not shown), at a remotely located control station (not shown), and so on). The controllers 52 may be in electronic, hydraulic, or other communication with various other systems or devices of the baler 40 (or machinery). For example, the controller 52 may be in electronic or hydraulic communication with various actuators, sensors, and other devices within (or outside of) the baler 40, including various devices associated with the baling chamber 50 and related mechanisms. The controller 52 may communicate with other systems or devices (including other controllers) in various known ways, including via a CAN bus (not shown) of the baler 40 or a towing vehicle, wirelessly, hydraulically, or otherwise.

In the embodiment depicted in FIG. 2, the reciprocating plunger 48 moves in a cyclical, front-to-back path (i.e., generally left-to-right, in FIG. 2) as driven by a rotating crank arm 56 (or multiple crank arms (not shown)). A feeder assembly successively delivers flakes 54 of crop material (e.g., flakes 54a depicted in FIG. 2) into the path of the plunger 48, near the forward portion of the baling chamber 50. The cyclical motion of the plunger 48 pushes these flakes 54 rearward into the baling chamber 50, compressing the flakes 54 into a growing bale.

In certain embodiments, as depicted in FIGS. 2-5, a hydraulic (or other) cylinder 38 may be configured to operate the crank arm 56, in order to move the plunger 48. In these embodiments, the crank arm 56 may be rotated over only a portion of a full revolution, as the cylinder 38 is alternated between extending and retracting operations. In certain embodiments, a gear box may alternatively (or additionally) be provided to operate the crank arm 56. For example, a gear box may be configured to receive rotational power from a power take-off shaft of the vehicle 22 (e.g., as may extend through the connection 22a), and utilize the received power to rotate the crank arm 56. In embodiments with a gear box, the crank arm 56 may be rotated through a complete revolution. Other devices or systems may alternatively (or additionally) be utilized to move a crank arm (e.g., the crank arm 56) or a crop-moving device (e.g., the plunger 48). For example, in certain embodiments, a screw drive (not shown) or other mechanism may be utilized to move a plunger into and out of a baling chamber.

A baling chamber may be bounded (or otherwise defined) in a variety of ways. As depicted, the chamber 50 is generally bounded at the left side with a side wall 66 and at the right side with a gate 60. Also as depicted, hydraulic cylinders 62 and 64, mounted to support structures 64 and 70, respectively, are configured to actuate the side wall 66 and the gate 60, respectively, in order to eject bales from the baling chamber 50. For example, as controlled by the controller 52, and in coordinated timing with the plunger 48 and other baler components, the cylinder 68 may move the side wall 66 laterally across the baling chamber from left to right and from right to left. Similarly, the cylinder 62 may move the gate 60 up and down to open or close an ejection passage for a bale that has been formed in the baling chamber 50. In this way, a formed bale may be moved by the side wall 66 and cylinder 68 through the opening of the gate 60.

It will be understood that other configurations may be possible. Generally, to eject formed bales from the chamber 50, a side member of various designs may be moved laterally (or otherwise) across the baling chamber 50. In certain embodiments, the side member may be configured as a complete side wall of the baling chamber 50, as with the side wall 66. In certain embodiments, the side member may be otherwise configured. For example, a lattice, mesh, grating, or other partial wall may be provided, which may also be moved laterally across the baling chamber by an actuator of various types. Similarly, a piston, plunger, or other side member may be provided, which may not span the entire length, height, or width of the chamber 50, but which may nonetheless be actuated to eject a bale from the chamber 50. In certain embodiments, a side member may be oriented on a side of the baling chamber 50 other than a lateral side of the baling chamber (e.g., a top, bottom, or rear side of the chamber 110). In certain embodiments, various linkages, rotating members or other actuator mechanisms may be utilized in place of the cylinder 68 and the support structure 76.

A gate may also be configured in various ways. Generally, a gate may serve to retain a bale within the baling chamber 50 while the bale is being formed (and after), as well as to release the formed bale from the baling chamber 50 when appropriate. A gate may be a knife-gate such as the depicted gate 60, which moves up and down along a defined path to open or close an ejection passage for the bale. Alternatively (or additionally) a gate may be configured to slide laterally, forward, or rearward, with respect to the baler 40, to swing open and closed in various ways, to fold or roll closed, and so on.

Still referring to FIG. 2, a rear wall 72 of the baling chamber 50 provides resistance to the plunger in order for the various flakes 54 to be compressed by the plunger 48 into a finished bale. An actuator, such a hydraulic cylinder 74 is provided (e.g., supported with respect to the chassis 44 by a support structure 76), in order to control actuation of the rear wall 72. As discussed in greater detail below, the cylinder 74 (or another actuator) may control the rear wall 72 based upon predetermined compression distances, compression pressures, or other factors.

Again, it will be understood that other configurations may be possible. As depicted, because the rear wall 72 bounds the baling chamber 50 opposite the plunger 48, the baling chamber 50 may be viewed as a blind baling chamber. Other types and configurations of a rear wall of the chamber 50 may be provided as an alternative to the depicted rear wall 72. In certain embodiments, for example, the baling chamber 50 may not include a rear wall and, as such, may not be a blind chamber.

The various support structures 64, 70 and 76 for the cylinders 62, 68 and 74 (or other support structures for other actuators) may be configured in a variety of ways. As depicted, the support structures 64, 70, and 76 include metal tubing welded to the chassis 44 of the baler 40 in order to rigidly support the cylinders 62, 68, and 74 with respect to the chassis 44 and the baling chamber 50. Other arrangements are also possible.

One or more bale chutes may also be provided on the baler 40, to receive and wrap bales that are ejected from the baling chamber 50. In the embodiment depicted in FIG. 2, for example, a bale chute 82 is configured as a platform that is laterally adjacent to, and extends laterally away from, the right side of the baling chamber 50. Accordingly, a bale ejected through the right side of the baling chamber 50 may generally pass onto the bale chute 82 before being ejected from the baler 40 to the field (or another location). As depicted, the bale chute 82 is generally oriented horizontally, such that a bale resting on the bale chute 82 may tend to remain on the bale chute 82 absent active ejecting force.

Other configurations are also possible. Generally, a bale chute may be configured as a variety of platforms or other support structures that are located adjacent to and outside of a relevant baling chamber. The platform or other support structures of a bale chute may be configured to extend to various widths, laterally, away from the associated baling chamber. In certain embodiments, such a platform or support structure may be generally less wide than the nominal width of an associated bale (or bale chamber). In this way, a bale that is fully ejected from a baling chamber onto a bale chute may extend laterally past the laterally outer edge of the bale chute. In certain embodiments, a bale chute may be oriented obliquely with respect to horizontal, such that a bale on the bale chute may be biased by gravity away from (or toward) the relevant baling chamber. In certain embodiments, as discussed in greater detail below, multiple bale chutes may be provided for a particular baling chamber.

A bale chute may generally support, or be otherwise associated with, a wrapping device for wrapping bales on the bale chute with wrap material (and, in certain embodiments, tying or otherwise securing the wrap material). In this way, even if a bale is in an unwrapped (or partially unwrapped) state when ejected from a baling chamber to a bale chute, the bale may still be wrapped before it is finally ejected from the baler (e.g., to the field, or to a trailing carriage). As depicted in FIG. 2, the baler 40 includes various sleeve supports 88 supported by the chassis 44. A sleeve 84 of wrap material (e.g., of plastic wrap material) is supported on the supports 88, such that a bale moving from the baling chamber 50 across the bale chute 82 passes through the sleeve 84 and is wrapped by the wrap material of the sleeve 84. The sleeve supports 88 are depicted as laterally extending members oriented on the bale chute 82 to secure the sleeve 84 in place on the bale chute 82 and hold the ends of the sleeve 84 open at the inner and outer lateral edges of the bale chute 82. Other configurations of the supports 88, the sleeve 84, and so on, may also be possible.

Figure 3:
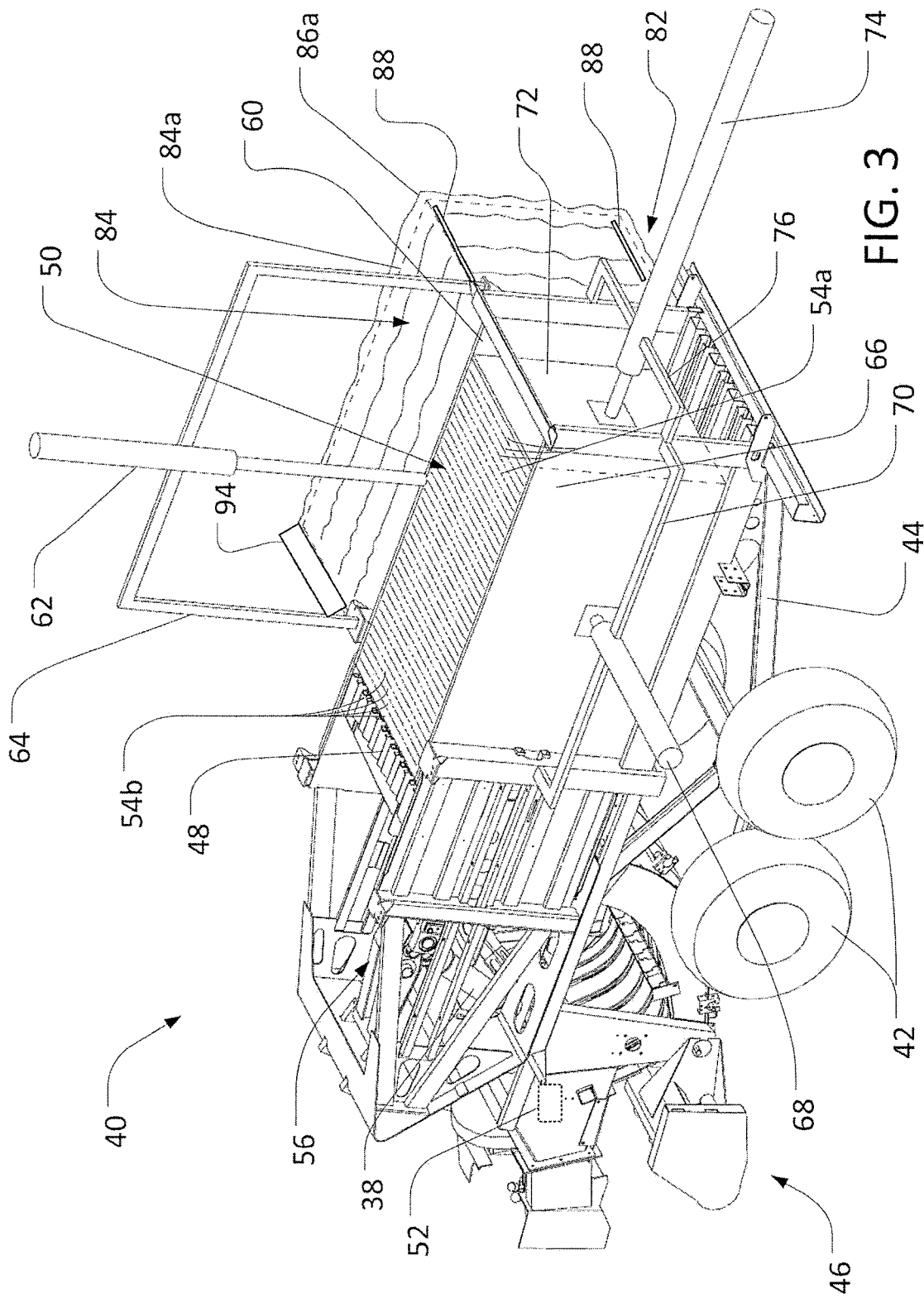

In certain embodiments, a wrapping device other than a sleeve and sleeve support may be provided. In certain embodiments, for example, a hoop or other device may be utilized to loop wrap material (e.g., from rolls of wrap material) around a bale in a bale chute. As depicted in FIG. 3, for example, a roll 94 of wrap material and the associated wrapping device (or another similar arrangement) may be provided as an alternative (or in addition) to the supports 88 and sleeve 84 (or other wrapping device configuration). The roll 94 of wrap material may be supported on (or near) the bale chute 82 in a variety of ways, and an associated device (not shown) may loop material from the roll 94 around a bale on the bale chute 82 in order to wrap the bale.

In certain embodiments, twine or similar material may be utilized as an alternative (or in addition) to the sleeve 84 (or other configurations of wrap material). As depicted in FIG. 2, for example, a number of knotters 92 (or other wrapping devices) may be provided. Twine (not shown) may be looped around a bale in the bale chute 82 and then tied with the knotters 92 to secure the twine on the bale.

In certain embodiments, a wrap device may wrap a bale on a bale chute with wrap material as the bale is indexed across the bale chute. For example, as a bale is urged across a bale chute (e.g., directly by a moveable side member of a baling chamber, or indirectly by a moveable side member pushing another bale against the bale in the bale chute) a wrapping device may loop twine, net wrap, plastic sheeting or other wrap material around the bale. Accordingly, as the bale in the bale chute moves past the wrapping device, the bale may be wrapped with successive spirals of the wrap material.

Returning specifically to the depicted embodiment of the baler 40, the various mechanisms noted above may operate cooperatively to form a bale in the baling chamber 50, eject the bale to the baling chute 82, wrap the bale, then eject the bale from the baler 40. Referring again to FIG. 2, at the start of a baling cycle, the side wall 66 is oriented at the left side of the baling chamber 50 and the gate 60 is in a lowered configuration (and thereby provides a second side wall for the baling chamber 50). The cylinder 74 is in an extended configuration, such that the rear wall 72 is located near the front of the baling chamber 50. As a number of initial flakes 54a are successively provided by the feeding mechanism, the reciprocating motion of the plunger 48 compresses the flakes 54a against the rear wall 72 to begin to form a bale. In certain instances, an already-formed bale 86a may already rest on the bale chute 82 within the sleeve 84.

As noted above, the cylinder 74 and the rear wall 72 may be controlled in a variety of ways to facilitate compression of the flakes 54a by the plunger 48. In certain implementations, the controller 52 may direct the cylinder 74 to move the rear wall 72 rearward within the baling chamber 50 by a particular distance for each cycle of the plunger 48. For example, if a typical flake 54a should be compressed by the plunger 48 to a front-to-back thickness of 1.5 inches in order to form an appropriately compressed bale in the baling chamber 50, the cylinder 74 may be actuated to move the rear wall 72 approximately 1.5 inches rearward in the baling chamber 50 for each new flake 54a (and, accordingly, for each reciprocating cycle of the plunger 48). As also noted above, because this distance may be viewed as the width to which a particular flake 54a may be compressed, it may be viewed as a compression distance.

In certain implementations, the controller 52 may direct the cylinder 74 to provide a particular pressure to the rear wall 72 in order to resist the rearward, compressive motion of the plunger 48. For example, if a particular compression pressure (i.e., a target pressure) is required to appropriately compress a particular flake 54a (or set of flakes 54a) into a bale, the cylinder 74 may be actuated to provide this pressure to the rear wall 72. In certain embodiments, an accumulator 78 (or similar device) may be provided to assist in maintaining the appropriate target pressure with the cylinder 74.

In certain implementations, the controller 52 may direct the cylinder to implement a combination of pressure- and distance-based control. For example, at or before the start of a compression stroke of the plunger 48, the cylinder 74 may be actuated to move the rear wall 72 rearward by a particular compression distance, which distance may be somewhat less than the expected (or target) thickness of a fully compressed flake 54a. After some time, the cylinder 74 may then be utilized maintain an appropriate target pressure (or pressure range) to resist the compression force of the plunger 48 and ensure proper compression of the current flake 54a (e.g., even as the cylinder 74 allows the rear wall 72 to move rearward within the baling chamber 50).

As one advantage of combining pressure- and distance-based control of the rear wall 72, a constant (or otherwise controlled) resistive pressure provided by the cylinder 74 via the rear wall 72 may be applied against the movement of the plunger 48 only when the crank arm 56 is oriented to provide an enhanced mechanical advantage with respect to movement of the plunger 48. It will be understood, for example, that when the crank arm 56 driving the plunger 48 is vertically oriented, relatively high torque must be applied to the crank arm 56 in order to provide a given amount of pressure at the plunger 48. Accordingly, the rear wall 72 may be moved rearward over a predetermined compression distance in order to provide relatively little resistance to the plunger 48 while the crank arm 56 of the plunger is close to its vertical orientation.

Figure 5:
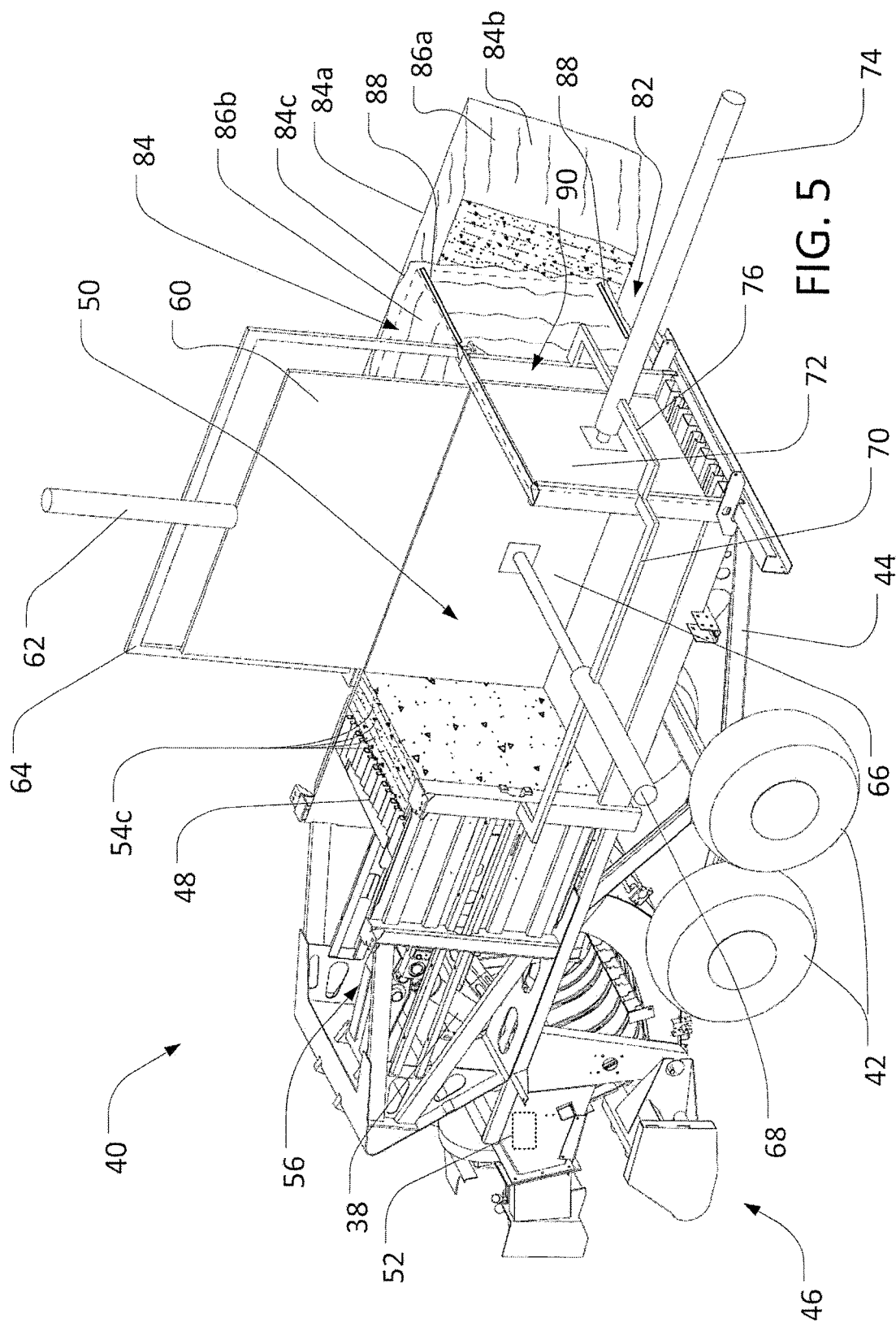
Figure 6A:
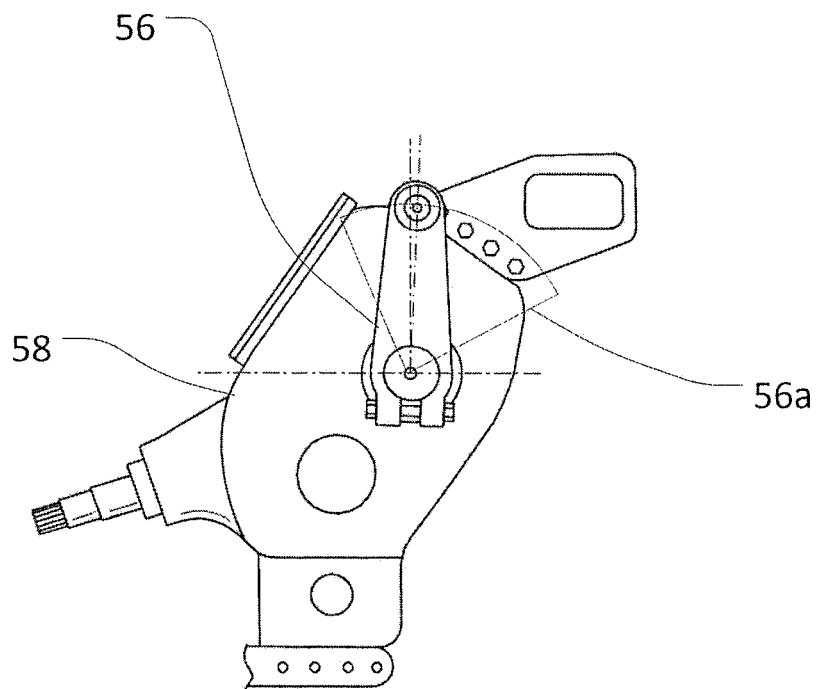
FIGS. 6A and 6B are side views of an example mechanism for moving a plunger to form square bales.

Referring to FIG. 6A, for example, an example configuration for driving the crank arm 56 with a gear box 58 is depicted. (As depicted in FIG. 6A, the gear box 58 may be disposed in the baler 40 with the baling chamber 50 to the right.) As the gear box 58 rotates the crank arm 56 in a clockwise direction (from the perspective of FIG. 6A), the crank arm 56 may move the plunger 48 (not shown in FIG. 6A) to compress a bale within the baling chamber 50. While the crank arm 56 is disposed within a particular angular range around or near a vertical orientation (e.g., within range 56a) the rear wall 72 may be suitably controlled based on compression distance. It will be understood that the range 56a is provided as an example only, and that other ranges of crank arm orientation may be selected to correspond to distance-based control of the rear wall 72. Further, it will be understood that a similar control strategy may be employed in embodiments in which the plunger 48 is otherwise moved (e.g., in embodiments utilizing a cylinder, such as the cylinder 38 depicted in FIGS. 2-5).

In contrast, as the crank advances toward a horizontal orientation (e.g., to move the plunger 48 rearward within the baling chamber 50), relatively less torque must be applied to the crank arm 56 in order to provide the same amount of pressure (or more) at the plunger 48. As the crank arm 56 advances toward horizontal, therefore, the rear wall 72 may provide (via the cylinder 74) a predetermined target pressure (e.g., rather than a predetermined compression distance), thereby allowing the plunger 48 to strongly compress the flakes 54a against the rear wall 72 without requiring excessive torque at the crank arm 56.

Figure 6B:
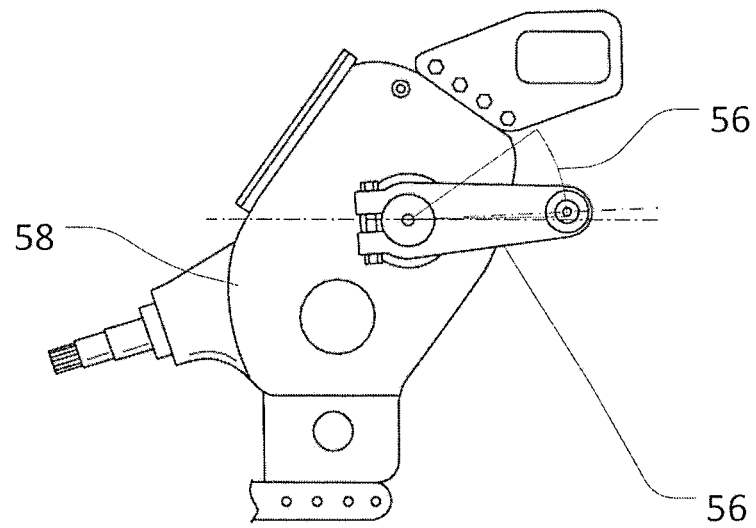

Referring to FIG. 6B, for example, the example gearbox configuration of FIG. 6A is depicted with the crank arm 56 having advanced almost to a horizontal orientation. While the crank arm 56 is disposed within a particular angular range around or near the horizontal orientation (e.g., within range 56b) the rear wall 72 may be controlled based on target pressure, rather than compression distance. It will be understood that the range 56b is provided as an example only, and that other ranges of crank arm orientation may correspond to pressure-based control of the rear wall 72. Further, it will be understood that a similar control strategy may be employed in embodiments in which the plunger 48 is otherwise moved (e.g., in embodiments utilizing a cylinder, such as the cylinder 38 depicted in FIGS. 2-5).

In certain embodiments, other mechanisms may be controlled in various ways depending on the relative position of the plunger 48, the crank arm 56, and so on. In the embodiment depicted in FIGS. 2-5, for example, the cylinder 38 (or a similar cylinder) may be controlled with respect to the position of the crank arm 56, the position of the plunger 48, or the position or pressure at the rear wall 72. For example, as also noted above, where the rear wall 72 has been moved a predetermined compression distance within the baling chamber 50, a relatively small amount of force may be required at the cylinder 38 to appropriately move the plunger 48. Accordingly, a relatively low pressure or low power flow may be utilized by the cylinder 38 to move the crank arm 56 to compress the crop material against the rear wall 72. When the cylinder 74 is then utilized to provide a target pressure at the rear wall 72, a larger force may be required to compress the relevant flake. Accordingly, a higher pressure or higher power flow may be utilized by the cylinder 38 to move the crank arm 56.

Referring again to FIG. 3, as the baler 40 progresses along the field, the baling chamber 50 is gradually filled with a number of compressed flakes 54. As can be seen in FIG. 3, for example, the original flakes 54a (see FIG. 2) are approaching the rear of the baling chamber 50 even as new flakes 54b continue to be delivered for compression. As the baling operation progresses (i.e., from FIG. 2 to FIG. 3), the rear wall 72 is moved farther and farther to the rear of the baling chamber 50 by the rear cylinder 76. As noted above, various types of control are possible for this rearward movement, including control based upon predetermined compression distances and control based upon target pressures. In certain embodiments, particular compression distances or target pressures may be modulated depending on the progression of bale formation (e.g., depending on the current size of the bale, or the relative position of the rear wall 72 within the baling chamber 50).

Figure 4:
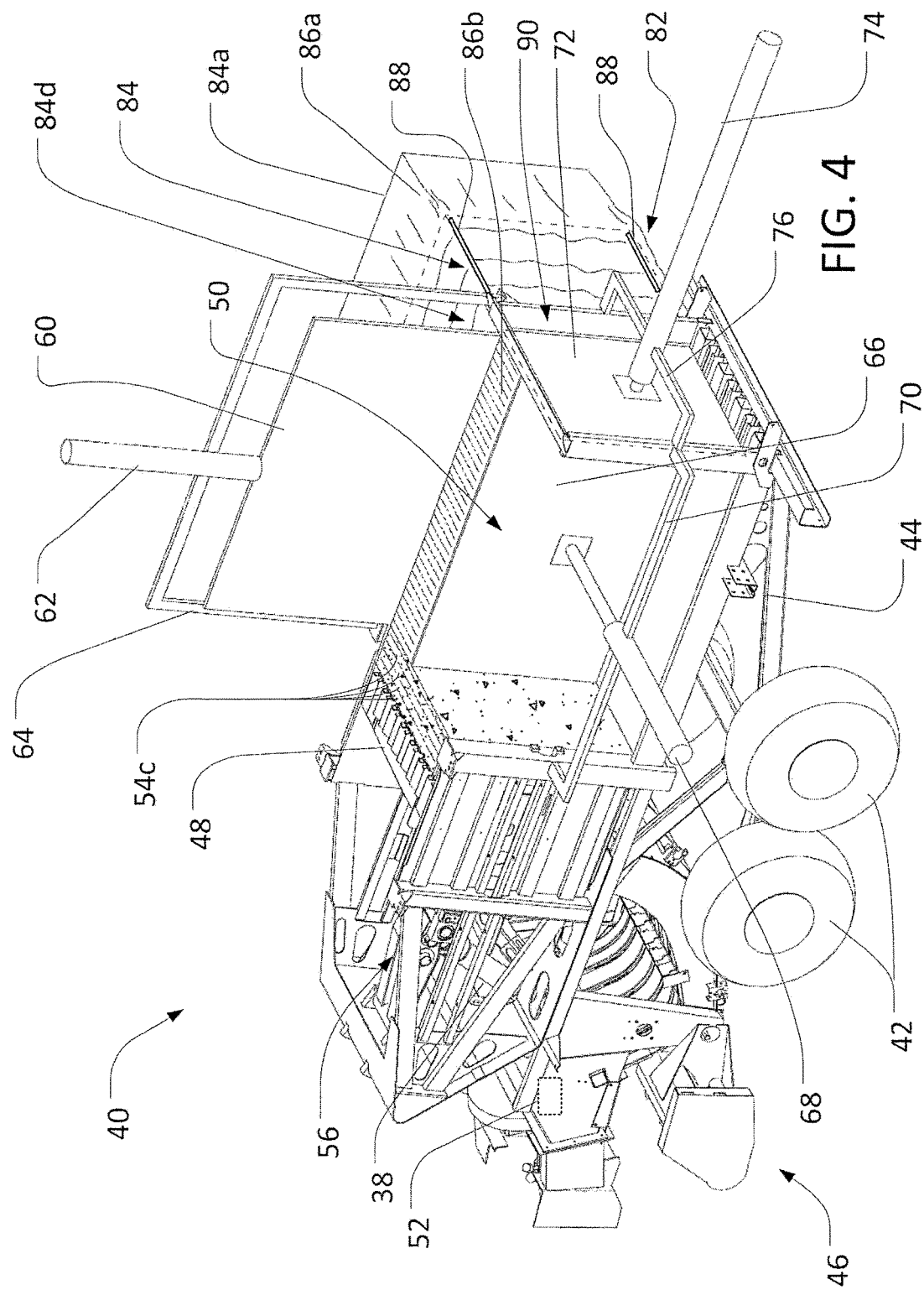

Referring also to FIG. 4, the various flakes 54 have been compressed within the baling chamber 50 into an unwrapped bale 86b. Accordingly, the cylinder 62 causes the gate 60 raise, thereby opening an ejection passage 90 between the baling chamber and the bale chute 82. The cylinder 68 then causes the side wall 66 to push the bale 86b from the baling chamber 50 to the bale chute 82 for wrapping. As depicted, for example, as the bale 86b is pushed from the baling chamber 50, the bale 86b passes into an inlet end 84d of the sleeve 84 of wrap material, as supported by the sleeve supports 88, and is thereby wrapped with wrap material.

Where the previously-formed bale 86a is already at the bale chute 82, as in the embodiment depicted in FIG. 4, the urging of the bale 86b from the baling chamber 50 to the bale chute 82 causes the bale 86a to be moved laterally off of the bale chute 82. In certain embodiments, this may further contribute to the wrapping of the previously-formed bale 86a. As depicted in FIGS. 2 and 3, for example, when the bale 86b is fully supported by the bale chute 82, the outer lateral edges of the bale 86b may engage with the outer lateral edge 84a of the sleeve 84 (i.e., may engage with the wrap material near the outlet end of the sleeve 84). This engagement of the bale 86b with the edge 84a (or other portion) of the sleeve 84 causes the bale 86a to pull material from the sleeve 84 as the bale 86a is pushed laterally outward from the baler 40. In this way, the wrap material of the sleeve 84 may wrap the entire lateral width of the bale 86a as the bale 86a is ejected from the bale chute 82 and the baler 40.

As depicted in FIG. 5, as the bale 86a falls away from the bale chute 82, a portion 84b of the wrap material of the sleeve 84 may separate from the sleeve 84 to maintain the wrapped state of the bale 86a. For example, a perforated seam may dispose the sleeve 84 to separate at the edge 84c when the bale 86a falls from the bale chute 82, and thereby allow the portion 84b to remain wrapped on the bale 86a. The edge 84c may then be disposed to engage with the outer lateral edge of the subsequent bale 86b. In certain embodiments, the portion 84b of the sleeve 84 may be separated from the remainder of the sleeve 84 in other ways, including with various cutting devices (not shown) or other mechanisms.

Still referring to FIG. 5, due to the motion of the side wall 66 and the gate 60, the bale 86b has been ejected from baling chamber 50 to the bale chute 82 (and into the sleeve 84) and the previously-formed bale 86a has been ejected, in a fully wrapped state, from the bale chute 82 to the field. The system may then be reset to the configuration of FIG. 1, in order to allow the incoming flakes 54c to be compressed within the baling chamber 50 into another bale.

In certain embodiments, it may require a longer time to eject a bale from the baling chamber 50 to the bale chute 82 than to complete a front-to-back compression cycle with the plunger 48. Accordingly, in certain implementations, it may be useful to pause the operation of the plunger 48, or otherwise delay compression of new flakes 54c within the baling chamber 50, during the ejection of an already-formed bale from the baling chamber 50. In the embodiment depicted in FIG. 5, for example, the cylinder 68 first extends the side wall 66 across the baling chamber to eject a bale, then retracts the side wall 66 to its starting position. During this cycle, the movement of the plunger 48 may be arrested (or slowed) or incoming crop material (not shown) may be temporarily stored at another location (not shown) while the cylinder 68 operates to eject the bale 86b. Once the side wall 66 is appropriately oriented, the operation of the plunger 48 to compress various incoming flakes may then resume.

In certain embodiments, a bale may be over-compressed within a baling chamber, such that the bale will expand somewhat once the relevant compressive forces of the baling chamber have been removed. In certain embodiments, such over-compression may further facilitate improved wrapping of the relevant bale. With respect to the baler 40, for example, the plunger 48 and the rear wall 72 may cooperate to over-compress the bale 86b, in the baling chamber 50, to a size that is somewhat smaller than the ejection passage 90 or the support structures 88 and the sleeve 84. As a result, the formed bale 86b may be moved through the ejection passage 90 and into the sleeve 84 relatively easily, with little risk of the sides of the bale 86b inappropriately catching on the sides of the passage 90, the sleeve 84, the support structures 88, and so on. Further, because of the over-compression, the bale 86b may begin to expand somewhat once the compressive forces of the plunger 48 and the rear wall 72 have been removed. With appropriate timing, this expansion may be made to occur, at least in part, while the bale 86b is enclosed by the sleeve 84 (or otherwise being engaged by a wrapping device). As such, because of the initial over-compression of the bale 86b, the bale 86b may tend to expand into the wrap material of the sleeve 84 and thereby provide for more secure engagement of the wrap material with the bale 86b.

Figure 7:
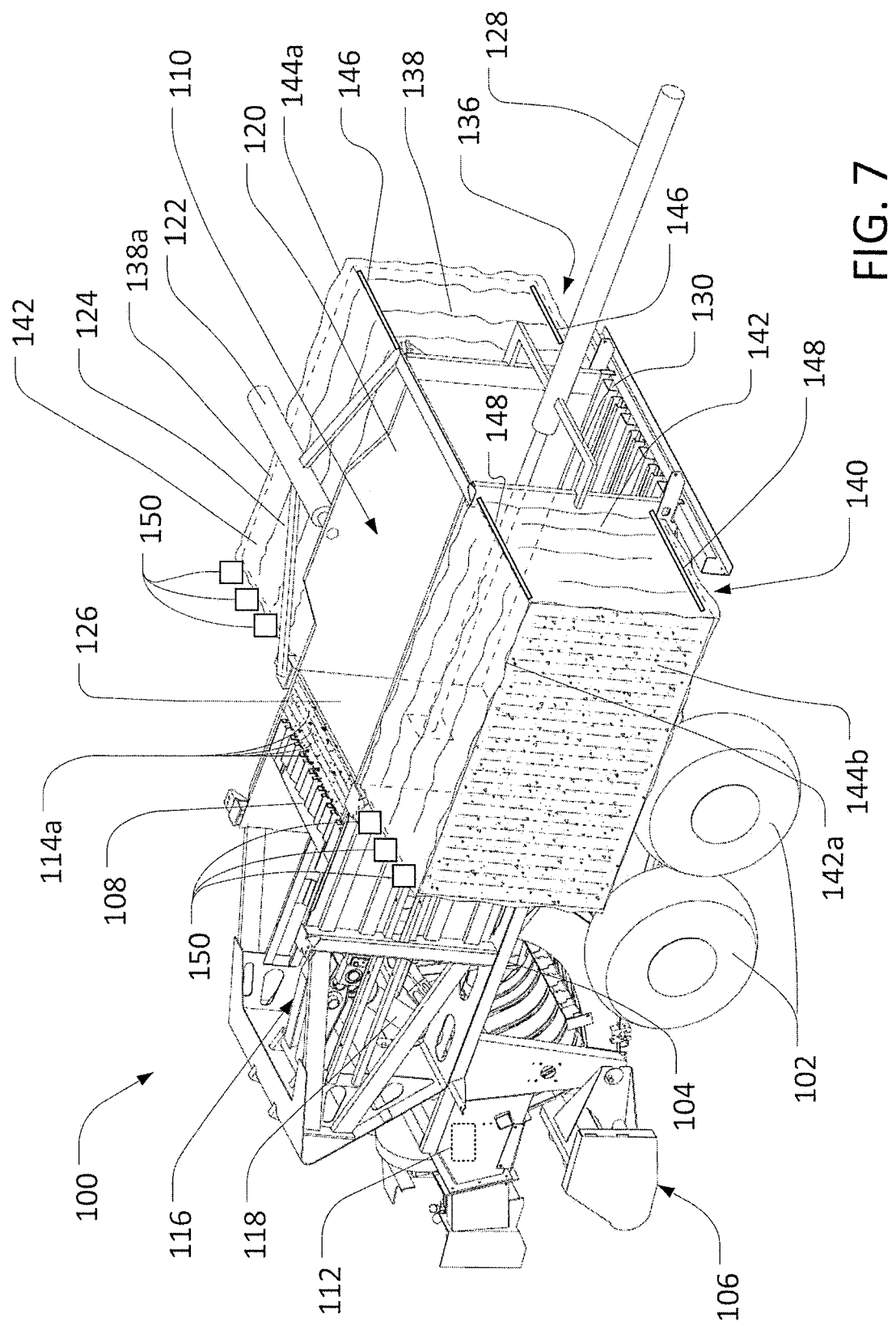
FIGS. 7-10 are perspective views depicting the formation and ejection of square bales by another example baler according to this disclosure.

As also noted above, in certain embodiments, multiple bale chutes may be provided. Referring also to FIG. 7, another example baler 100 is depicted. (For clarity of presentation of various internal mechanisms, the housing of the baler 100 is not depicted in the various figures.) The baler 100 may be similar to the baler 40 in various ways. For example, the baler 100 is generally supported for travel over a field by wheels 102 mounted to a chassis 104. A pick-up assembly 106 for gathering crop material from a field is provided, which may be similar to the pickup assemblies 26 and 46. Crop material gathered by the pick-up assembly 106 is routed upward and rearward through the baler 100 and formed into generally rectangular flakes 114. The flakes 114 are then compressed within a baling chamber 110 by a reciprocating plunger 108 to form a bale. The baler 100 may also include one or more controllers 112.

In the embodiment depicted in FIG. 7, the reciprocating plunger 108 moves in a cyclical, front-to-back path (i.e., generally left-to-right, in FIG. 7) as driven by a rotating crank arm 116. A feeder assembly successively delivers flakes 114 of crop material (e.g., flakes 114a depicted in FIG. 2) into the path of the plunger 108, near the forward portion of the baling chamber 110. The cyclical motion of the plunger 108 pushes these flakes 114 rearward into the baling chamber 110, compressing the flakes 114 into a growing bale. In the embodiment depicted in FIGS. 7-10, a hydraulic cylinder 118 may be utilized to move the crank arm 116. It will be understood that other arrangements may be utilized to move the crank arm 116, including a gear box similar to the gear box 58 of FIGS. 6A and 6B, an auger, or other mechanism.

As depicted, the baling chamber 110 is generally bounded laterally by a single moveable side wall 120. Hydraulic cylinder 122, mounted to support structure 124 is configured to actuate the side wall 120, in order to eject bales from the baling chamber 110. For example, as controlled by the controller 112, and in coordinated timing with the plunger 108 and other baler components, the cylinder 122 may move the side wall 120 laterally across the baling chamber from left to right and from right to left. In this way, the plunger 108 and side wall 120 may alternately eject formed bales to the right and left sides of the baling chamber 110.

It will be understood that other configurations may be possible. Generally, to eject formed bales from the chamber 110, a side member of various designs may be moved laterally (or otherwise) across the baling chamber 110. In certain embodiments, the side member may be configured as a complete side wall of the baling chamber 110, as with the side wall 120. In certain embodiments, the side member may be otherwise configured. For example, a lattice, mesh, grating, or other partial wall may be provided, which may also be moved laterally across the baling chamber by an actuator of various types. Similarly, a piston, plunger, or other side member may be provided, which may not span the entire length, height, or width of the chamber 110, but which may nonetheless be actuated to eject a bale from the chamber 110. In certain embodiments, a side member may be oriented on a side of the baling chamber 110 other than a lateral side of the baling chamber (e.g., a top, bottom, or rear side of the chamber 110). In certain embodiments, various linkages, rotating members or other actuator mechanisms may be utilized in place of the cylinder 122 and the support structure 124.

In the embodiment depicted in FIG. 7, no gate similar to the gate 60 (see, e.g., FIG. 5) is used to control an ejection passage for release of a bale from the baling chamber 110. In certain embodiments, however, a gate of various configurations may be utilized, including a gate similar to the gate 60 of FIGS. 2-5.

Still referring to FIG. 7, a rear wall 126 of the baling chamber 110 provides resistance to the plunger in order for the various flakes 114 to be compressed by the plunger 108 into a finished bale. An actuator, such a hydraulic cylinder 128 is provided (e.g., supported with respect to the chassis 104 by a support structure 130), in order to control actuation of the rear wall 126. As discussed above, with regard to the cylinder 74 and rear wall 72, the cylinder 128 (or another actuator) may control the rear wall 126 based upon predetermined compression distances, compression pressures, or various other factors.

Again, it will be understood that other configurations may be possible. As depicted, because the rear wall 126 bounds the baling chamber 110 opposite the plunger 108, the baling chamber 110 may be viewed as a blind baling chamber. Other types and configurations of a rear wall of the chamber 110 may be provided as an alternative to the depicted rear wall 126. In certain embodiments, for example, the baling chamber 110 may not include a rear wall and, as such, may not be a blind chamber.

The various support structures 124 and 130 for the cylinders 122 and 128 (or other support structures for other actuators) may be configured in a variety of ways. As depicted, the support structures 124 and 130 include metal tubing welded to the chassis 104 of the baler 100 in order to rigidly support the cylinders 122, and 128 with respect to the chassis 104 and the baling chamber 110. Other arrangements are also possible.

A plurality of bale chutes may also be provided on the baler 100, to receive and wrap bales that are ejected from the baling chamber 110. In the embodiment depicted in FIG. 7, for example, a bale chute 136 is configured as a platform that is laterally adjacent to, and extends laterally away from, the right side of the baling chamber 110. Accordingly, a bale ejected through the right side of the baling chamber 110 may generally pass onto the bale chute 136 before being ejected from the baler 100 to the field (or another location). Similarly, a bale chute 140 is configured as a platform that is laterally adjacent to, and extends laterally away from, the left side of the baling chamber 110. Accordingly, a bale ejected through the left side of the baling chamber 110 may generally pass onto the bale chute 136 before being ejected from the baler 100 to the field (or another location). As depicted, the bale chutes 136 and 140 are generally oriented horizontally, such that a bale resting on either of the bale chutes 136 and 140 may tend to remain on the bale chutes 136 and 140 absent active ejecting force (or tilting of the baler 100). Other configurations are also possible, including configurations in which either of the bale chutes 136 and 140 may be oriented obliquely with respect to horizontal. In certain embodiments, one or more of the bale chutes 136 and 140 may itself be moveable. For example, a hydraulic actuator (not shown) may be provided to tilt one of the bale chutes 136 and 140 away from the baling chamber 110 in order to encourage a bale on the bale chute 136 or 140 to slide off of the chute 136 or 140.

As noted above, a bale chute may generally support, or be otherwise associated with, a wrapping device. In this way, if a bale is in an unwrapped (or partially unwrapped) state when ejected from a baling chamber to a bale chute, the bale may be wrapped at the bale chute before it is ejected to the field (or elsewhere). As depicted in FIG. 7, the baler 100 includes various sleeve supports 146 and 148 supported by the chassis 104. Sleeves 138 and 142 of wrap material (e.g., of plastic wrap material) are supported, respectively, on the supports 146 and 148, such that bales moving from the baling chamber 110 across the bale chutes 136 and 140 pass through the sleeves 138 and 142, respectively, and are wrapped by the wrap material of the sleeves 138 and 142. The sleeve supports 146 and 148 are depicted as laterally extending members oriented on the bale chutes 136 and 140 to secure the sleeves 138 and 142 in place on the bale chutes 136 and 140 and hold the ends of the sleeves 138 and 142 open at the inner and outer lateral edges of the bale chutes 136 and 140. Other configurations of the supports 146 and 148, the sleeves 138 and 142, and so on, may also be possible.

Figure 8:
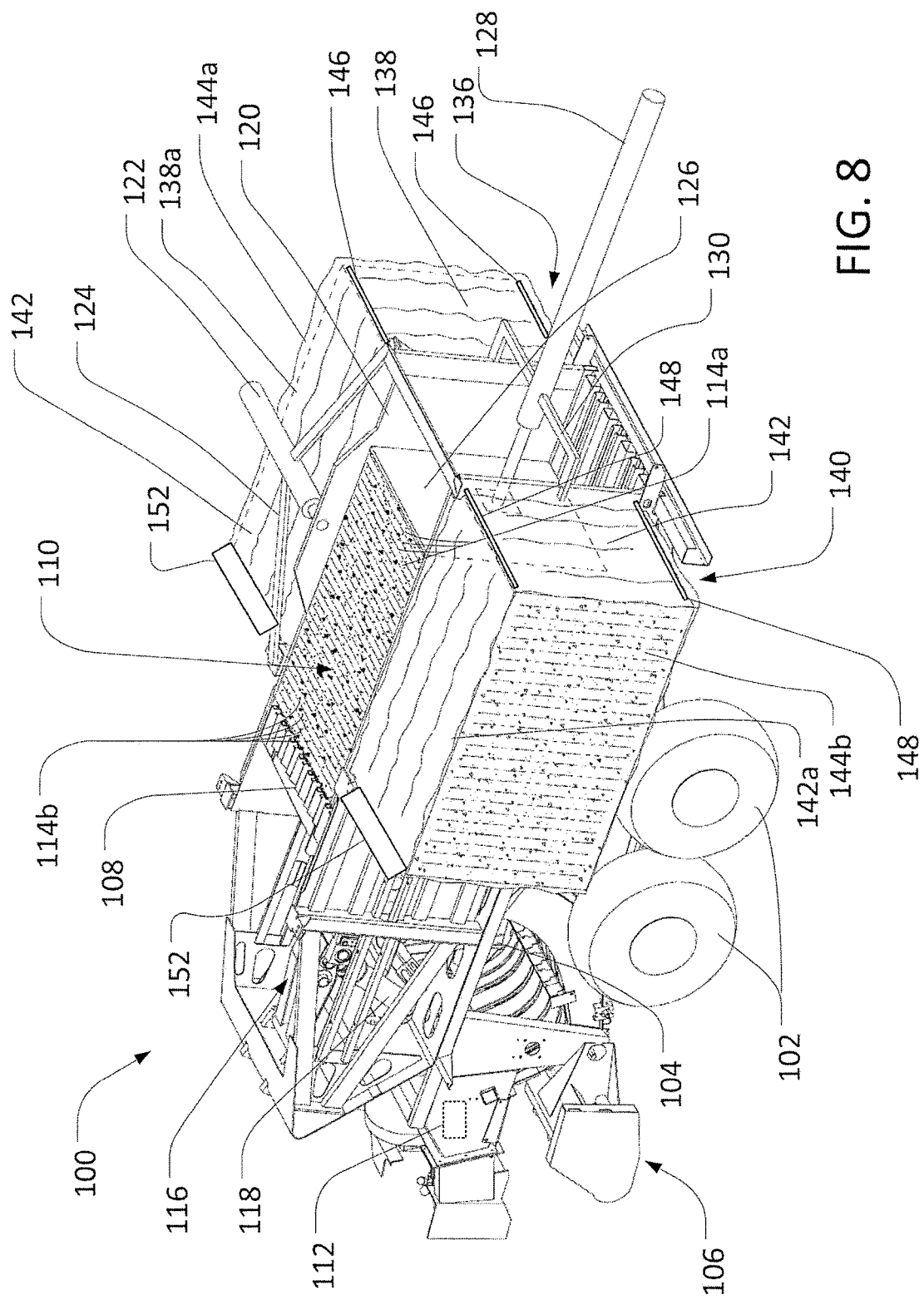

In certain embodiments, a wrapping device other than a sleeve and sleeve support may be provided. In certain embodiments, for example, a hoop or other device may be utilized to loop wrap material (e.g., from rolls of wrap material) around a bale in a bale chute. As depicted in FIG. 8, for example, rolls 152 of wrap material and associated wrapping devices (or another similar arrangement) may be provided as an alternative (or in addition) to the supports 146 and 148 and sleeves 138 and 142. The rolls 152 of wrap material may be supported on (or about) the bale chutes 136 and 140 in various ways, and various associated devices (not shown) may loop material from the rolls 152 around bales on the bale chutes 136 and 140 in order to wrap the bales.

In certain embodiments, twine or similar material may be utilized as an alternative (or in addition) to the sleeves 138 and 142 (or other configurations of wrap material). As depicted in FIG. 7, for example, a number of knotters 150 (or other wrapping devices) may be provided for each of the bale chutes 136 and 140. Twine (not shown) may be looped around bales in the bale chutes 136 and 140 and then tied with the knotters 150 to secure the twine on the bales.

Returning specifically to the baler 100, as depicted, the various mechanisms noted above may operate cooperatively to form a bale in the baling chamber 110, eject the bale to one of the baling chutes 136 and 140, wrap the bale, then eject the bale from the baler 100. Referring again to FIG. 7, for example, the side wall 120 is oriented at the right side of the baling chamber 110 at the start of a bailing cycle. The cylinder 128 is in an extended configuration, such that the rear wall 126 is located near the front of the baling chamber 110. As a number of initial flakes 114a are successively provided by the feeding mechanism, the reciprocating motion of the plunger 108 compresses the flakes 114a against the rear wall 126 to begin to form a bale. In certain instances, already-formed bales 144a and 144b may already rest on the bale chutes 136 and 140 within (or at least partially within) the sleeves 138 and 142.

Similarly to the cylinder 74 of the baler 40 (see, e.g., FIG. 2), the cylinder 128 and the rear wall 126 may be controlled in a variety of ways to facilitate compression of the flakes 114a by the plunger 108. In certain implementations, for example, the controller 112 may control the rear wall 126 based upon a predetermined compression distance, a predetermined target pressure, a combination of compression distance and target pressure, or various other parameters.

Referring again to FIG. 8, as the baler 100 progresses along the field, the baling chamber 110 is gradually filled with a number of compressed flakes 114. As can be seen in FIG. 8, for example, the original flakes 114a (see FIG. 7) are approaching the rear of the baling chamber 110 even as new flakes 114b continue to be delivered for compression. As the baling operation progresses (i.e., from FIG. 7 to FIG. 8), the rear wall 126 is moved farther and farther to the rear of the baling chamber 110 by the rear cylinder 128. As noted above, various types of control are possible for cylinder 128 and rear wall 126.

Figure 9:
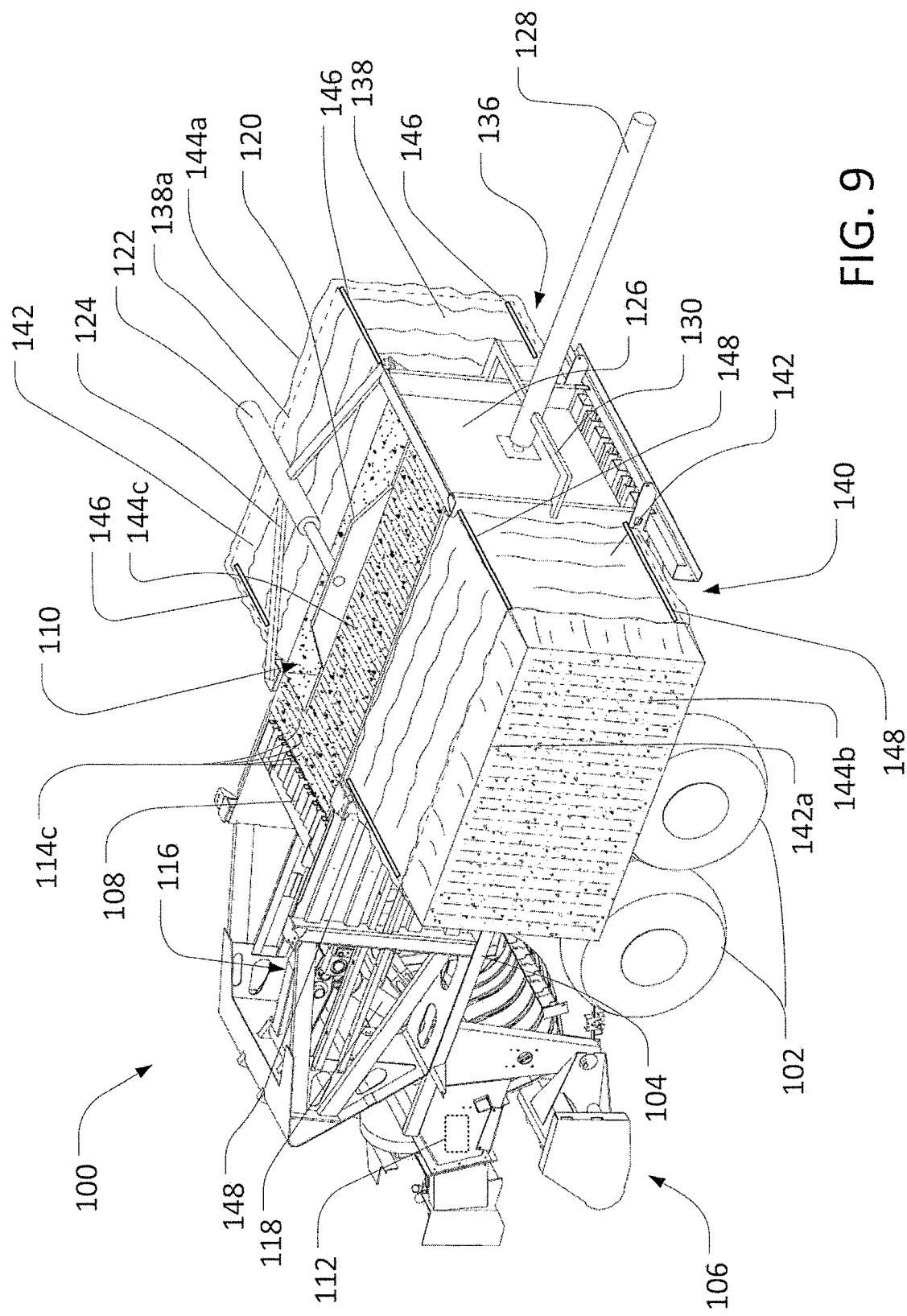

Referring also to FIG. 9, the various flakes 114 have been compressed within the baling chamber 110 into a completed, unwrapped bale 144c. The cylinder 122 then causes the side wall 120 to push the bale 144c from the baling chamber 110 to the bale chute 140 for wrapping. As depicted, for example, as the bale 144c is pushed from the baling chamber 110, the bale 144c passes into the sleeve 142 of wrap material supported by the sleeve supports 148. The wrap material may thereby be wrapped onto the bale as the bale passes through (or out of) the sleeve. (It will be understood that, in certain implementations, the bale 144c may be partially wrapped by other wrapping devices (not shown) before, or while, being ejected from the baling chamber 110 to the chute 140.)

Where the previously-formed bale 144b is already at the bale chute 140, as in the embodiment depicted in FIG. 9, the urging of the new bale 144c from the baling chamber 110 to the bale chute 136 causes the older bale 144a to be moved laterally off of the bale chute 136. In certain embodiments, this may further contribute to the wrapping of the older bale 144b. As depicted in FIGS. 7 and 8, for example, when the bale 144b is fully supported by the bale chute 136, the outer lateral edges of the bale 144b may engage with the outer lateral edge 142a of the sleeve 142. This engagement of the bale 144b with the edge 142a (or other portion) of the sleeve 142 causes the bale 144b to pull material from the sleeve 142 as the bale 144b is pushed laterally outward from the baler 100. In this way, the wrap material of the sleeve 142 may wrap the entire lateral width of the bale 144b as the bale 144b is ejected from the bale chute 140 and the baler 100.

Figure 10:
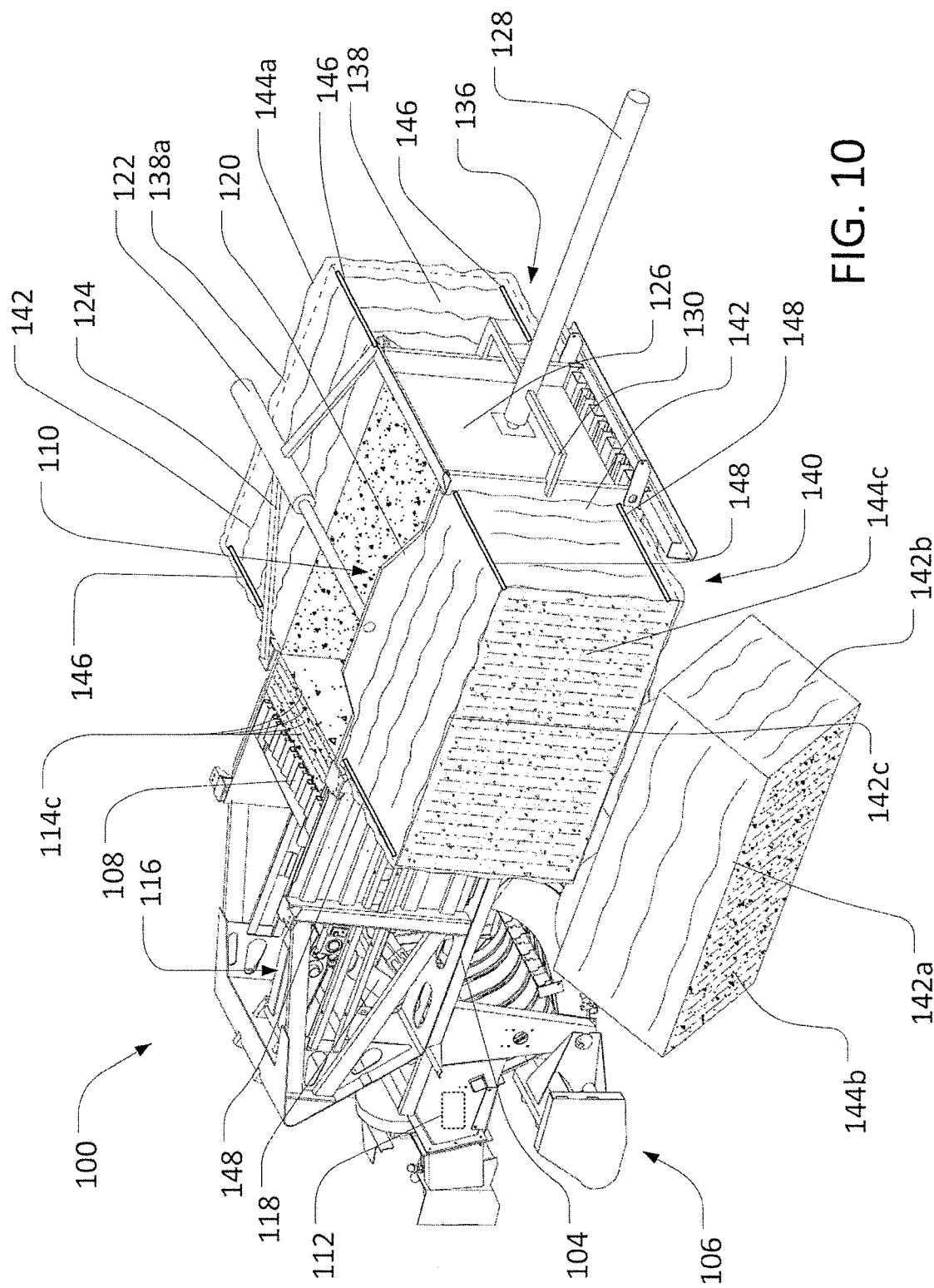

As depicted in FIG. 10, as the bale 144b falls away from the bale chute 140, a portion 142b of the wrap material of the sleeve 142 may pull away from the sleeve 142 to maintain the wrapped state of the bale 144b. For example, a perforated seam may dispose the sleeve 142 to separate at the edge 142c when the bale 144b falls away from the bale chute 140, and thereby allow the portion 142b to remain wrapped on the bale 86a. The edge 142c may then be disposed to engage with outer lateral edge of the subsequent bale 144c.

The bale 144a may similarly interact with the edge 138a of the sleeve 138 as the bale 144a is ejected from the bale chute 136.

Still referring to FIG. 10, due to the motion of the side wall 120, the bale 144c has been ejected from baling chamber 110 to the bale chute 140 (and into the sleeve 142) and the previously-formed bale 144b has been ejected, in a fully wrapped state, from the bale chute 140 to the field. With the side wall 120 remaining at the left side of the baling chamber 110, the rear wall 126 may then be returned to the configuration of FIG. 7, in order to allow new incoming flakes 114c to be compressed within the baling chamber 110 into another bale. When this bale (not shown) is completed, the side wall 120 may then be moved by the cylinder 122 back to the right side of the baling chamber 110, in order to eject the new bale to the bale chute 136.

Figure 11:
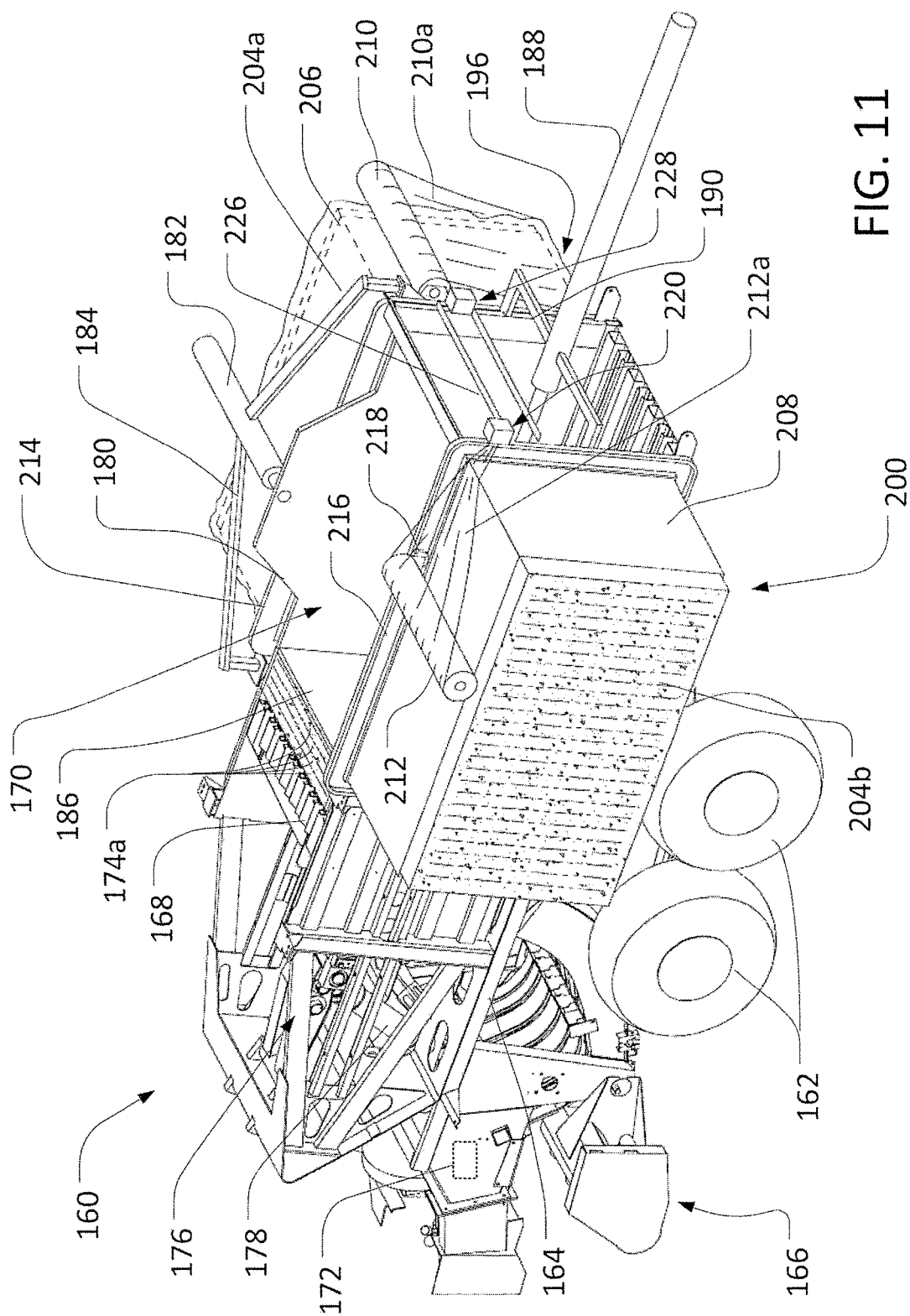
FIGS. 11-16 are perspective views depicting the formation and ejection of square bales by still another example baler according to this disclosure.

Referring also to FIG. 11, another example baler 160 is depicted. (For clarity of presentation of various internal mechanisms, the housing of the baler 160 is not depicted in the various figures.) The baler 160 may be similar to the baler 100 in various ways. For a example, the baler 160 is generally supported for travel over a field by wheels 162 mounted to a chassis 164. A pick-up assembly 166 for gathering crop material from a field is provided, which may be similar to the pickup assembly 106. Crop material gathered by the pick-up assembly 166 is routed upward and rearward through the baler 160 and formed into generally rectangular flakes 174. The flakes 174 are then compressed within a baling chamber 170 by a reciprocating plunger 168 (or other crop-moving device) to form a bale. The baler 160 may also include one or more controllers 172 configured to control various operations of the baler 160.

In the embodiment depicted in FIG. 11, the reciprocating plunger 168 moves in a cyclical, front-to-back path (i.e., generally left-to-right, in FIG. 11) as driven by a rotating crank arm 176. A feeder assembly successively delivers flakes 174 of crop material (e.g., flakes 174a depicted in FIG. 2) into the path of the plunger 168, near the forward portion of the baling chamber 170. The cyclical motion of the plunger 168 pushes these flakes 174 rearward into the baling chamber 170, compressing the flakes 174 into a growing bale. In the embodiment depicted in FIGS. 11-16, a hydraulic cylinder 178 may be utilized to move the crank arm 176. It will be understood that other arrangements may be utilized to move the crank arm 176, including a gear box similar to the gear box 58 of FIGS. 6A and 6B, an auger, or other mechanism.

As depicted, the baling chamber 170 is generally bounded laterally by a single moveable side wall 180. A hydraulic cylinder 182 (or another actuator), mounted to support structure 184 is configured to actuate the side wall 180, which may be useful for ejecting formed bales from the baling chamber 170. For example, as controlled by the controller 172, and in coordinated timing with the plunger 168 and other baler components, the cylinder 182 may move the side wall 180 laterally across the baling chamber from left to right and from right to left. In this way, the plunger 168 and side wall 180 may alternately eject formed bales to the right and left sides of the baling chamber 170.

It will be understood that other configurations may be possible. Generally, to eject formed bales from the chamber 170, a side member of various designs may be moved laterally (or otherwise) across the baling chamber 170. In certain embodiments, the side member may be configured as a complete side wall of the baling chamber 170, as with the side wall 180. In certain embodiments, the side member may be otherwise configured. For example, a lattice, mesh, grating, or other partial wall may be provided, which may also be moved laterally across the baling chamber by an actuator of various types. Similarly, a piston, plunger, or other side member may be provided, which may not span the entire length, height, or width of the chamber 170, but which may nonetheless be actuated to eject a bale from the chamber 170. In certain embodiments, a side member may be oriented on a side of the baling chamber 170 other than a lateral side of the baling chamber (e.g., a top, bottom, or rear side of the chamber 170). In certain embodiments, various linkages, rotating members or other actuator mechanisms may be utilized in place of the cylinder 182 and the support structure 184.

In the embodiment depicted in FIG. 11, no gate similar to the gate 60 (see, e.g., FIG. 5) is used to control (e.g., open and close) an ejection passage for release of a bale from the baling chamber 170. In certain embodiments, however, a gate of various configurations may be utilized, including a gate similar to the gate 60 of FIGS. 2-5.

Still referring to FIG. 11, a rear wall 186 of the baling chamber 170 provides resistance to the plunger 168 in order for the various flakes 174 to be compressed by the plunger 168 into a finished bale. An actuator, such a hydraulic cylinder 188 is provided (e.g., supported with respect to the chassis 164 by a support structure 190), in order to control actuation of the rear wall 186. As discussed above, with regard to the cylinder 74 and rear wall 72, and the cylinder 128 and rear wall 126, the cylinder 188 (or another actuator) may control the rear wall 186 based upon predetermined compression distances, compression pressures, or various other factors.

As depicted, because the rear wall 186 bounds the baling chamber 170 opposite the plunger 168 (or other crop-moving device), the baling chamber 170 may be viewed as a blind baling chamber. Other types and configurations of a rear wall of the chamber 170 may be provided as an alternative to the depicted rear wall 186. In certain embodiments, for example, the baling chamber 170 may not include a rear wall and, as such, may not be a blind chamber.

The various support structures 184 and 190 for the cylinders 182 and 188 (or other support structures for other actuators) may be configured in a variety of ways. As depicted, the support structures 184 and 190 include metal tubing welded to the chassis 164 of the baler 160 in order to rigidly support the cylinders 182, and 188 with respect to the chassis 164 and the baling chamber 170. Other arrangements are also possible.

A plurality of bale chutes may also be provided on the baler 160, to receive and wrap bales that are ejected from the baling chamber 170. In the embodiment depicted in FIG. 11, for example, a bale chute 196 is configured as a platform that is laterally adjacent to, and extends laterally away from, the right side of the baling chamber 170. Accordingly, a bale ejected from the right side of the baling chamber 170 may generally pass onto the bale chute 196 before being ejected from the baler 160 to the field (or another location). Similarly, a bale chute 200 is configured as a platform that is laterally adjacent to, and extends laterally away from, the left side of the baling chamber 170. Accordingly, a bale ejected from the left side of the baling chamber 170 may generally pass onto the bale chute 196 before being ejected from the baler 160 to the field (or another location).

As depicted, the bale chutes 196 and 200 are generally oriented horizontally, such that a bale resting on either of the bale chutes 196 and 200 may tend to remain on the bale chutes 196 and 200, absent active ejecting force (or tilting of the baler 160). Other configurations are also possible, including configurations in which either of the bale chutes 196 and 200 may be oriented obliquely with respect to horizontal. In certain embodiments, one or more of the bale chutes 196 and 200 may itself be moveable. For example, a hydraulic actuator (not shown) may be provided to tilt one of the bale chutes 196 and 200 away from the baling chamber 170 in order to encourage a bale on the bale chute 196 or 200 to slide off of the chute 196 or 200.

As noted above, a bale chute may generally support, or be otherwise associated with, a wrapping device. In this way, if a bale is in an unwrapped (or partially unwrapped) state when ejected from a baling chamber to a bale chute, the bale may be wrapped at the bale chute before it is ejected to the field (or elsewhere). As depicted in FIG. 11, the baler 160 includes various wrap frames 206 and 208 supported by bale chutes 196 and 200, respectively (or otherwise supported by the chassis 164). As depicted, the wrap frames 206 and 208 are configured as metal (or other) boxes with continuous sheets of metal forming top, front and back sides of the wrap frames 206 and 208, and with the upper surfaces of the bale chutes 196 and 200, respectively, forming bottom sides of the wrap frames 206 and 208. The laterally inner and outer sides of the frames 206 and 208 are open, such that the frames 206 and 208 generally define a rectangular tube, and bales from the baling chamber 170 may pass laterally through the frames 206 and 208 as the bales move across the bale chutes 196 and 200. In other embodiments, the wrap frames 206 and 208 may be otherwise configured (e.g., as a construction of beams or tubing, as plastic or other material, as boxes with latticed or otherwise partially-opened sides, and so on). At the stage of a baling operation depicted in FIG. 11, each of the bale chutes 196 and 200 supports a bale (i.e., bales 204*a* and 204*b*, respectively) within the associated wrap frame 206 or 210. At other stage, other numbers of bales may be supported.

Generally, the wrap frames 206 and 208 may be configured to support separate sleeves of wrap material. In this way, for example, as a bale being ejected from the baling chamber 170 passes through the respective frames 206 and 208, the bale may be wrapped by the sleeves of wrap material. In certain embodiments, as described in greater detail below, a sleeve of wrap material supported by either of the wrap frames 206 and 208 may not be engaged to wrap a bale until the bale is moved through the wrap frame 206 or 208, respectively (e.g., as the bale is being ejected from the bale chute 196 or 200 to the ground). In certain embodiments, as described in greater detail below, the frames 206 and 208 may be configured such that a sleeve of wrap material may be formed on the frames 206 and 208 from sheets of wrap material, during operation of the baler 160.

In the embodiment depicted in FIGS. 11-16, a roll 210 of a sheet of wrap material (i.e., "sheet wrap") 210*a* is supported by the baler 160 with respect to the wrap frame 206 and a roll 212 of sheet wrap 212*a* is supported by the baler 160 with respect to the wrap frame 208. The sheet wrap 210*a* and 212*a* of the rolls 210 and 212 may take a variety of forms, including, for example, plastic sheeting, net wrap, breathable sheet wrap, composite sheets, and so on. During operation of the baler 160, as described in greater detail below, the rolls 210 and 212 may be moved in a generally cyclical path around the respective wrap frames 206 and 208 such that the sheet wrap 210*a* and 212*a* on the rolls 210 and 212 is formed into sleeves around the wrap frames 206 and 208. Bales passing through the sleeves may then engage the sheet wrap 210*a* or 212*a* such that the bales are appropriately wrapped before being ejected to the field (or elsewhere).

The sheet wrap 210a and 212a on the rolls 210 and 212 may be wrapped into sleeves in various ways. As depicted, the baler 160 includes track 214 and 216 extending generally around the wrap frames 206 and 208. Correspondingly, the support structures for the rolls 210 and 212 include members (e.g., wheels) to engage the tracks 214 and 216, respectively. As the members of the support structures move along the tracks 214 and 216, and the rolls 210 and 212 may accordingly be moved in successive cycles around the circuits prescribed by the tracks 214 and 216, and sleeves of wrap material created. As depicted, for example, the roll 212 is supported by a structure including a wheel 218 that engages the track 216 in order to carry the roll 212 in a cyclical path around the wrap frame 208. It will be understood, however, that other configurations may be possible. Various actuators (not shown) or other mechanisms (e.g., electric motors, gear or chain-and-sprocket arrangements, and so on) may be provided to move the rolls 210 and 212 along the path around the tracks 214 and 216.

Still referring to the example baler 160, the various mechanisms noted above may operate cooperatively to form a bale in the baling chamber 170, eject the bale to one of the baling chutes 196 and 200, wrap the bale, then eject the bale from the baler 160. As depicted in FIG. 11, for example, the side wall 180 is oriented at the right side of the baling chamber 170 at the start of a bailing cycle. The cylinder 188 is in an extended configuration, such that the rear wall 186 is located near the front of the baling chamber 170. As a number of initial flakes 174a are successively provided by the feeding mechanism, the reciprocating motion of the plunger 168 compresses the flakes 174a against the rear wall 186 to begin to form a bale. In certain instances, including as depicted, already-formed bales 204a and 204b may already rest on the bale chutes 196 and 200 within (or at least partially within) the sleeves 198 and 202.

Figure 12:
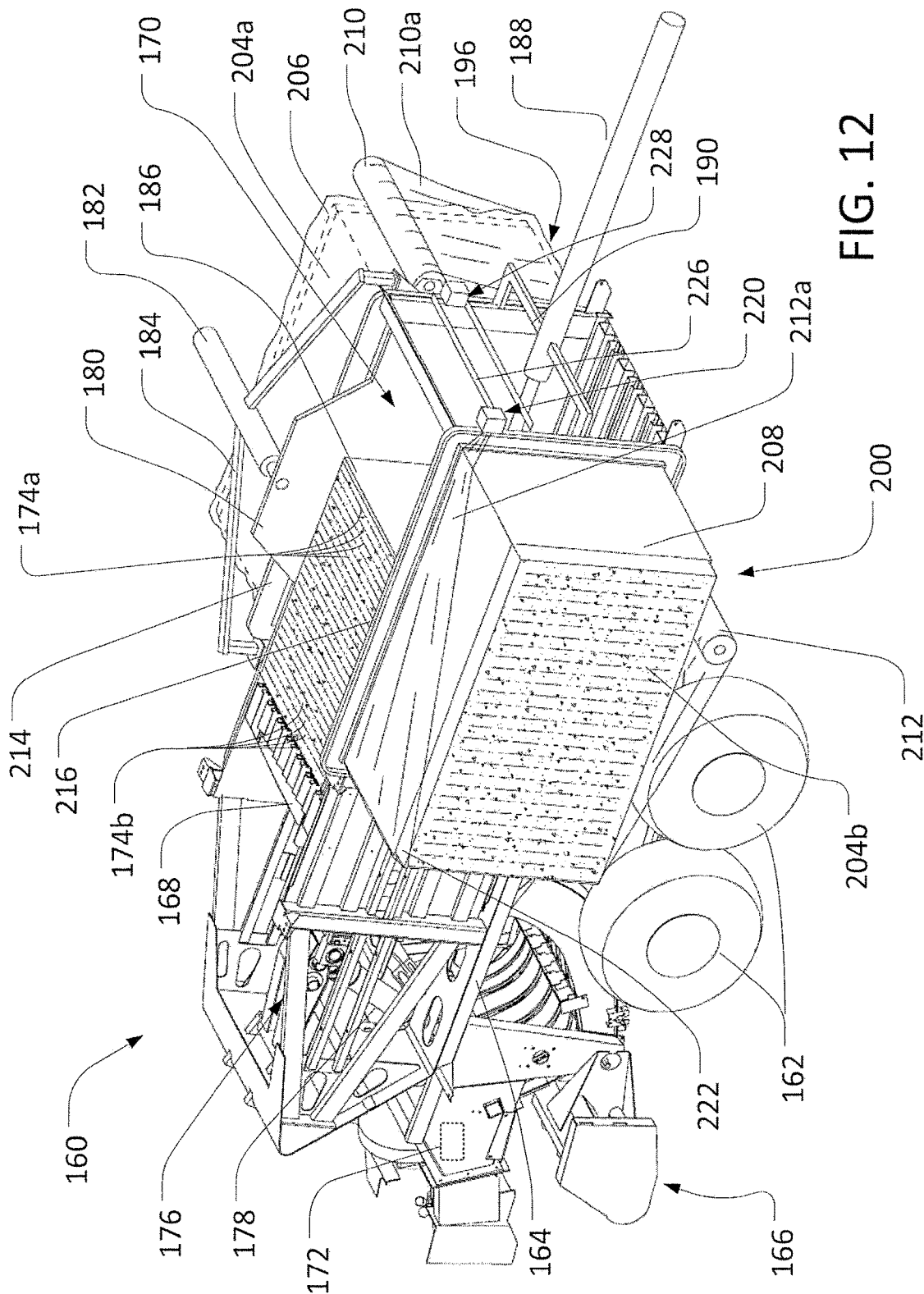

Referring also to FIG. 12, as the baler 160 progresses along the field, the baling chamber 170 is gradually filled with a number of compressed flakes 174. As can be seen in FIG. 12, for example, the original flakes 174a (see FIG. 11) are approaching the rear of the baling chamber 170 even as new flakes 174b continue to be delivered for compression. As the baling operation progresses (i.e., from FIG. 11 to FIG. 12), the rear wall 186 is moved farther and farther to the rear of the baling chamber 170 by the rear cylinder 188. As noted above, various types of control are possible for cylinder 188 and rear wall 186.

As the new bale is being formed in the baling chamber 170 from the various flakes 174, a wrapping process for one or both of the bales 204a and 204b may be executed. (It will be understood that the wrapping process may be executed at other times as well.) As depicted in FIG. 12, for example, as the flakes 174 are being compressed within the baling chamber 170, the roll 212 of sheet wrap is moved along the track 216 (e.g., by way of the wheel 218 (see FIG. 11)) such that the roll 212 begins to form the sheet wrap 212a into a sleeve surrounding the wrap frame 208. As depicted, a cutting mechanism 220 secures one end of the sheet wrap 212a, such that the sheet wrap 212a may be unrolled from the roll 212 as the roll 212 moves around the wrap frame 208. It will be understood, however, that other devices of components may be utilized to clamp (or otherwise anchor) the sheet wrap 212a, or otherwise ensure that the sheet wrap 212a appropriately unwinds from the roll 212. Also as depicted, a portion 222 of the sheet wrap 212a, which will eventual form a portion of the sleeve of wrap material, extends laterally outside of the outer edge(s) of the wrap frame 208. As described in greater detail below, this portion 222 of the sheet wrap 212a may allow the bale 204b to engage the sheet wrap 212a such that the bale 204b is appropriately wrapped when ejected from the bale chute 200.

At the stage in the wrapping (and baling) operation depicted in FIG. 12, the roll 212 has not yet completed a full cycle (e.g., a full revolution) around the wrap frame 208. As such, a complete loop of the sheet wrap 212a has not yet been formed. As the wrapping (and baling) operation continues, the roll 212 may continue along the cyclical path defined by the track 216, such that a complete loop, and thereby a sleeve (or at least a portion thereof) of the sheet wrap 212a is completed.

As depicted, the roll 210 is maintained in a steady position, with respect to the track 214, as the roll 212 is moved around the track 216 to create a sleeve of the sheet wrap 212a around the wrap frame 208. In other implementations, the rolls 210 and 212 may be moved simultaneously around the respective tracks 214 and 216 in order to simultaneously, at least in part, form sleeves of the wrap material 210a and 212a around the respective wrap frames 206 and 208.

Figure 13:
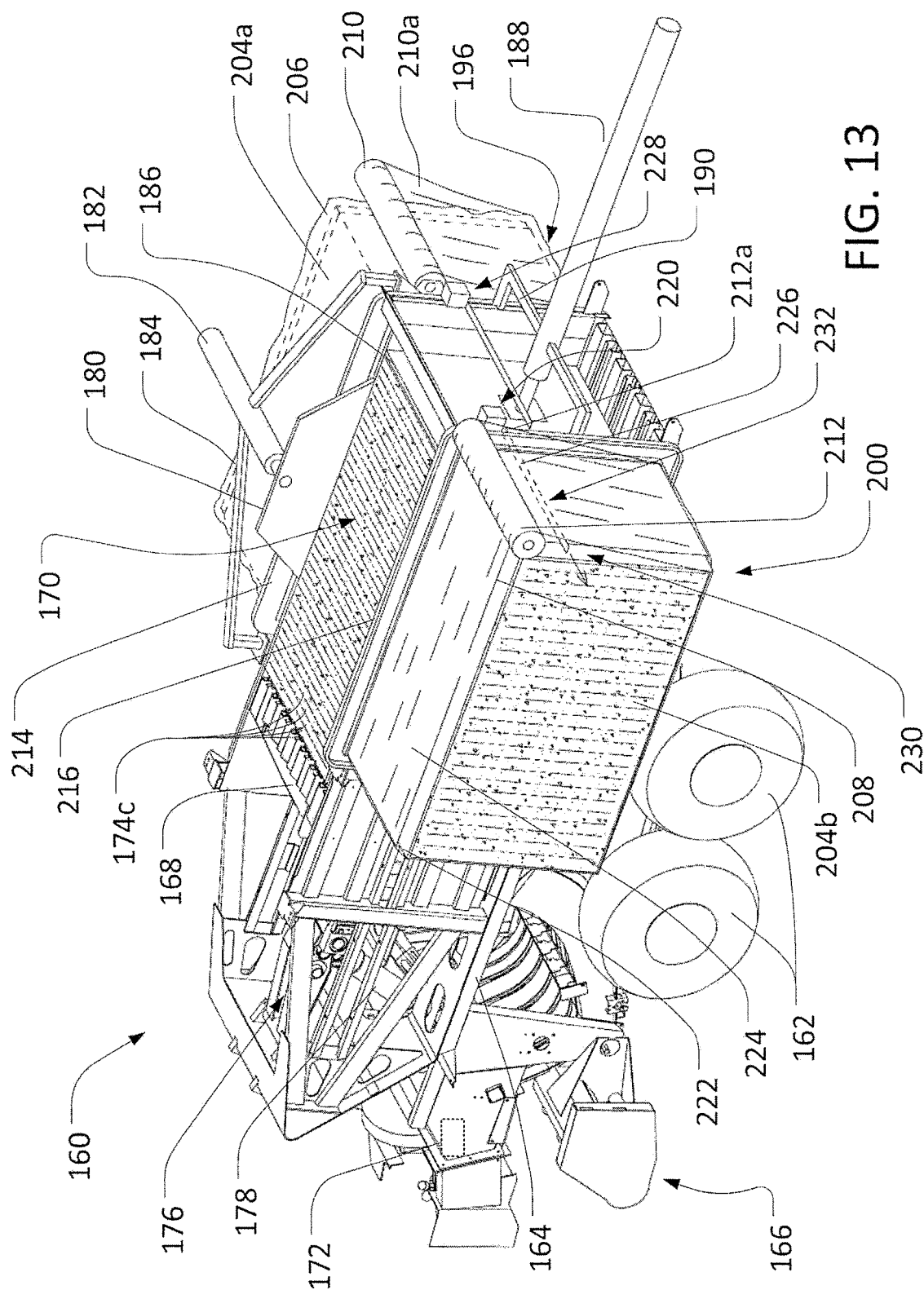

Referring also to FIG. 13, as the roll 212 completes a number of loops around the track 216 and the wrap frame 208, a sleeve 224 may be formed from one or more loops of the sheet wrap 212a. As noted above, the portion 222 of the wrap material 212a (and, thereby, the portion 222 of the sleeve 224) may extend laterally outward past the outer edge(s) of the wrap frame 208. This may be useful, for example, in order to ensure that the bale 204b appropriately engages the sleeve 224 for wrapping of the bale 204b. In the embodiment depicted, the sleeve 224 is formed from at least two loops of the sheet wrap 212a. In other embodiments, the sleeve 224 may instead be formed from a different number of loops of the sheet wrap 212a.

In order to sever the sheet wrap 212a forming the sleeve 224 from the sheet wrap 212a remaining on the roll 212, the cutting mechanism 220 may move a cutting tool across the sheet wrap 212a at a cutting location 232. The cutting mechanism 220 may be configured in a variety of ways, including with a cutting blade 226 moved by an electric or hydraulic actuator, as an electric lead (not shown) powered by an electric power source (e.g., for cutting plastic sheet wrap by application of current to melt the sheet wrap), and so on. As depicted, the cutting blade 226 may be configured as a generally straight blade, and the cutting mechanism 220 may include a linear actuator for moving the cutting blade 226 laterally, with respect to the baler 160, in order to cut the sheet wrap 212a (see FIG. 13) and to stow the cutting blade 226 at the rear of the baler 160 between cutting operations (see FIG. 14). Another (e.g., similar) cutting mechanism 228 may be provided to cut the sheet wrap 210a at the bale chute 196, or a single cutting mechanism may be utilized to cut the sheet wrap 212a and the sheet wrap 210a. Once the sheet wrap 212a has been cut, the cutting mechanism 220 may clamp (or otherwise anchor) the free end of the sheet wrap 212a in order to facilitate further unwinding of the sheet wrap 212a from the roll 212 for formation of a subsequent sleeve (not shown).

In certain implementations, it may be useful to cut the sheet wrap 212a (and the sheet wrap 210a) by directing cutting force for the sheet wrap 212a away from the formed sleeve 224 (or sleeve of the sheet wrap 210a). In this way, for example, if excessive cutting force is inadvertently applied, or if the cutting blade 226 or other mechanism is inadvertently moved too far through the sheet wrap 212a, damage to the sleeve 224 itself may be avoided. In the embodiment depicted, the cutting mechanism is disposed at the rearward end of the baler 160. It may therefore be useful to apply cutting force to the sheet wrap 212*a* in a generally rearward direction, in order to avoid damage to the sleeve 224. In certain embodiments, the cutting mechanism may be configured (or controlled, such as by the controller 172) such that the cutting blade 226 is extended to cut the sheet wrap 212*a* relatively promptly after the roll 212 has passed the cutting blade 226. In this way, the cutting blade 226 may be extended into a gap 230 between the sheet wrap 212*a* and the sleeve 224 and the sheet wrap 212*a* may be cut by the cutting blade 226 with a cutting force that is generally directed away from the sleeve 224 (i.e., in a rearward direction, as depicted). As depicted, the gap 230 may naturally result from the geometry of the unwinding of the sheet wrap 212*a* from the roller 212, such that the cutting blade 226 may be moved into the gap 230 based upon the timing of the movement of the roller 212 around the track 216 and past the cutting mechanism 220. It will be understood, however, that other configurations and implementations may be possible.

As depicted in FIG. 13, the cutting operation for the sheet wrap 212*a* may be executed when a new bale is nearly formed within the baling chamber 170, but new flakes 174*c* of crop material are still being fed into the baling chamber 170 for compression. This may be useful, for example, in order to ensure that the sleeve 224 is appropriately prepared to wrap the bale 204*b* before the bale 204*b* is ejected from the bale chute 200 (i.e., to make room for a new bale from the baling chamber 170). In other implementations, other timing may be utilized for cutting the sheet wrap 212*a* (as well as for wrapping the sheet wrap 212*a* to create the sleeve 224). For example, the sheet wrap 212*a* may be cut once a new bale has been completely formed in the baling chamber 170, when a new bale is not as close to completion as depicted in FIG. 13, or with various other timings.

Figure 14:
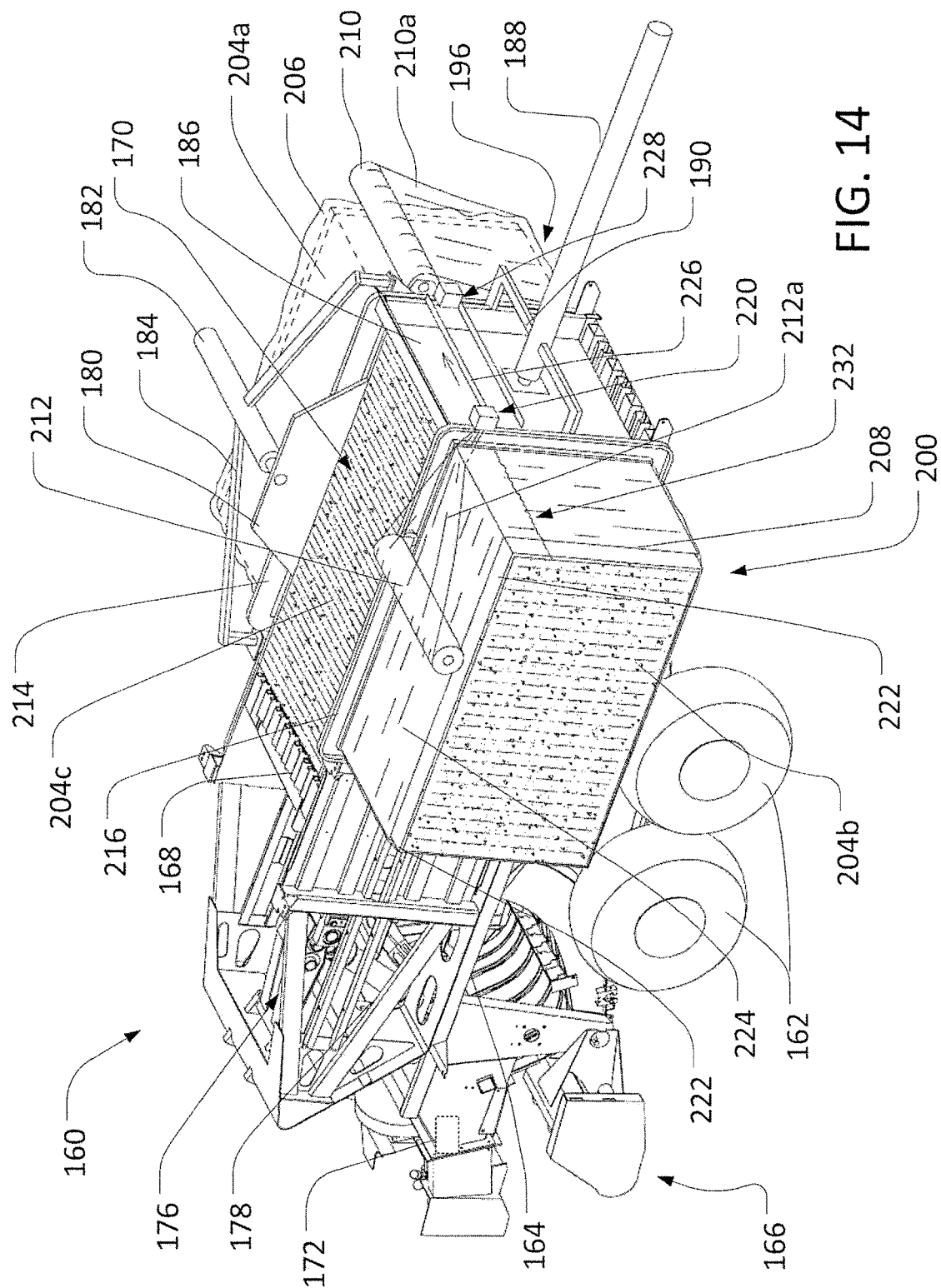
Figure 15:
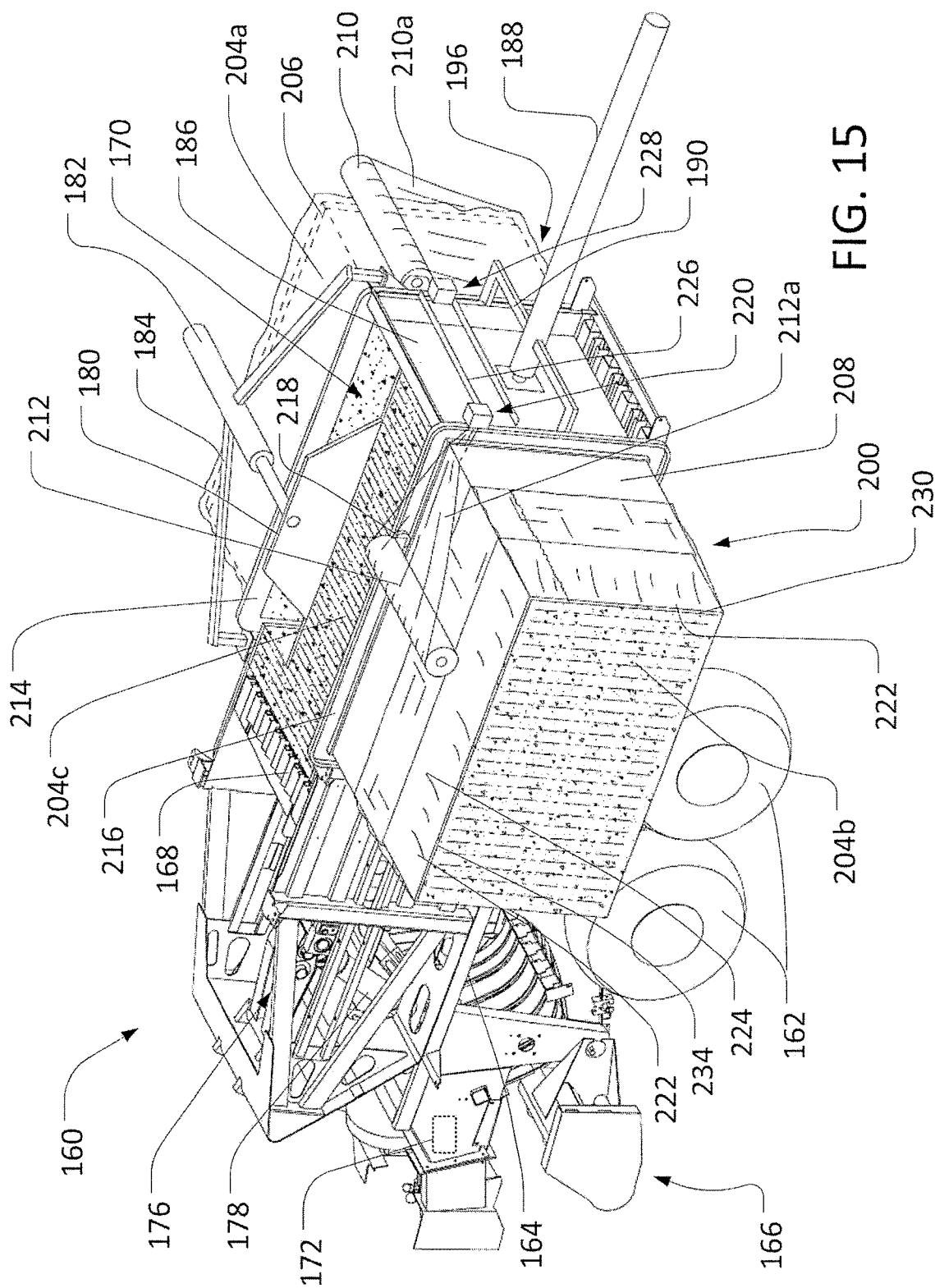
Figure 16:
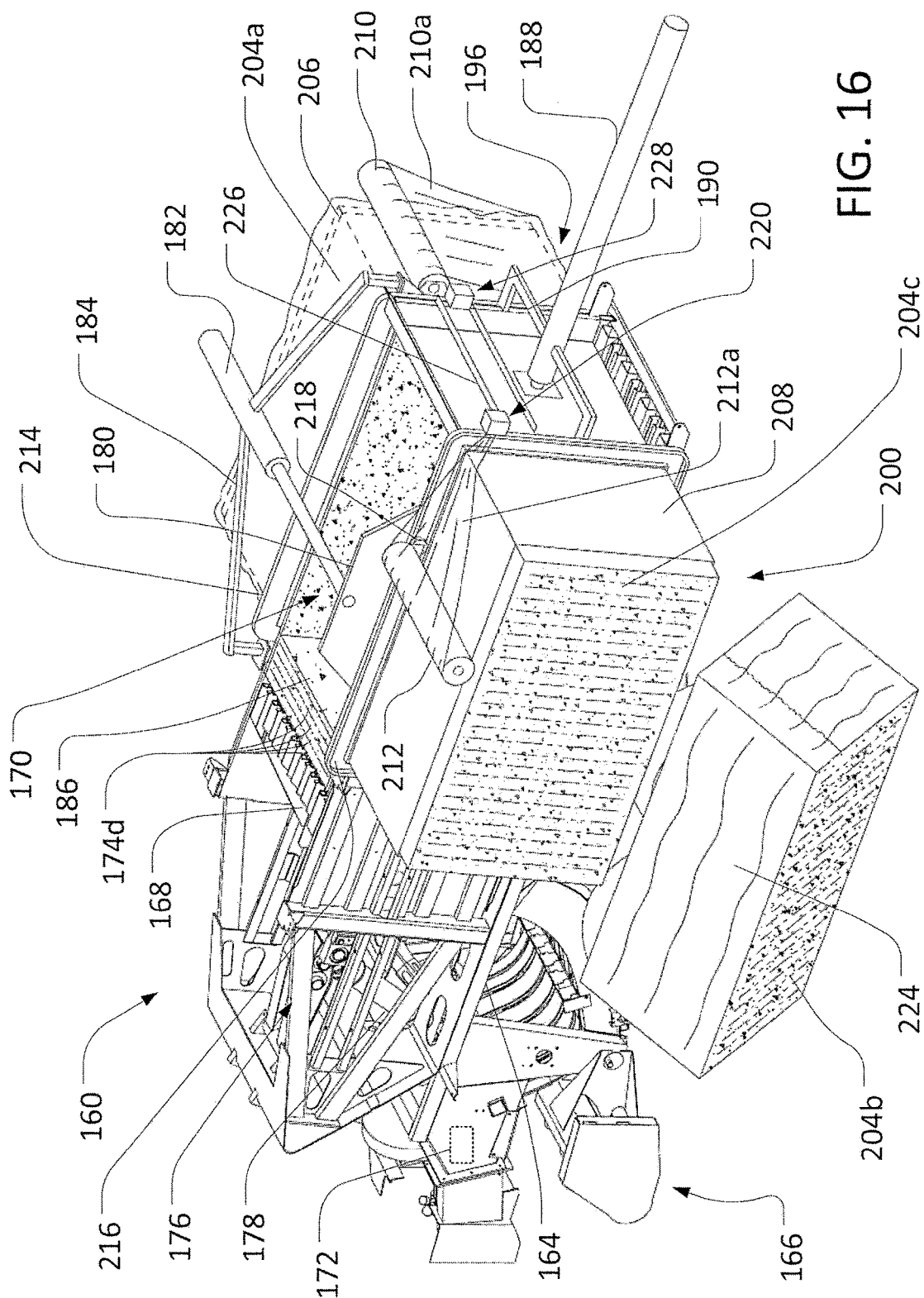

Referring also to FIG. 14-16, the various flakes 174 have been compressed within the baling chamber 170 into a completed, unwrapped bale 204*c*. The cylinder 182 may then cause the side wall 180 to push the bale 204*c* from the baling chamber 170 to the bale chute 200. In certain embodiments, this movement of the bale 204*c* may also cause a previously-formed bale to be ejected from the bale chute 200. As depicted, for example, as the bale 204*c* is pushed from the baling chamber 170, the bale 204*c* passes into the wrap frame 208, thereby pushing the bale 204*b* out of the wrap frame 208 and off of the bale chute 200.

As also noted above, as a bale moves off of a bale chute, the bale may pull a sleeve of wrap material with the bale, such that the bale may be fully wrapped before it falls to the ground (or elsewhere). Referring specifically to FIG. 15, for example, as the bale 204*b* is pushed laterally out of the wrap frame 208, the laterally outer edge 234 of the bale 204*b* engages the exposed portion 222 of the sheet wrap 212*a* such that the as the bale 204*b* moves out of the wrap frame 208 (see FIG. 15) and then falls away from the bale chute 200 (see FIG. 16), the bale 204*b* pulls the sleeve 224 from the wrap frame 208 to wrap the bale 204*b*.

Referring in particular to FIG. 16, due to the motion of the side wall 180, the bale 204*c* has been ejected from baling chamber 170 to the bale chute 200 (and into the wrap frame 208) and the previously-formed bale 204*b* has been ejected, in a fully wrapped state, from the bale chute 200 to the field. With the side wall 180 remaining at the left side of the baling chamber 170, the rear wall 186 may then be returned to the configuration of FIG. 11, in order to allow new incoming flakes 174*d* to be compressed within the baling chamber 170 into another bale. When this bale (not shown) is completed, the side wall 180 may then be moved by the cylinder 182 back to the right side of the baling chamber 170, in order to eject the new bale to the bale chute 196.

In certain embodiments, bales may be somewhat over-compressed within a baling chamber, with respect to the expected dimensions of the bales once they have been wrapped and ejected from the baler. In such embodiments, the bale chutes and the wrap frames (or other aspects of a baler) may sometimes be configured to be somewhat smaller than the final dimensions of the ejected bales, in order to maintain some degree of the over-compression when the bales are supported by (and contained within) the bale chutes and wrap frames (or elsewhere on the baler). In this way, for example, as the bales are ejected from the bale chutes, the bales may expand into the sleeves of wrap material supported by the wrap frames, thereby ensuring a relatively tight wrap of the bales by the wrap material. For example, in the embodiment depicted in FIGS. 11-16, the bale 204*b* may have been somewhat over-compressed within the baling chamber 170, and the bale chute 200 and wrap frame 208 may be configured with dimensions that maintain some degree of that over-compression when the bale 204*b* is supported by the bale chute 200. When the bale 204*b* is ejected from the bale chute 200 and the wrap frame 208 (e.g., as depicted in FIG. 15), the bale 204*b* may expand from its over-compressed state into the sleeve 224 such that the sleeve 224 holds the bale 204*b* with increased pressure and tightness.

In certain embodiments, other configurations of the wrap frames 206 and 208 (or other wrap frames) may be possible. For example, as depicted, the wrap frames 206 and 208 are formed as relatively rigid frames with generally squared corners and sides. In certain embodiments, a wrap frame may be configured to slope generally inward (i.e., toward a bale within the warp frame), such that the laterally outer edges of the wrap frame forms an outlet opening that is somewhat smaller than an inlet opening formed by the laterally inner edges of the wrap frame. This may be useful, for example, in order facilitate easier pulling of a sleeve of sheet wrap from the wrap frame as a bale moves from the wrap frame off of the relevant bale chute. In certain embodiments, a wrap frame may be configured as a telescoping, collapsible, expandable, or otherwise deformable or movable structure. This may be useful in a variety of instances.

Figure 17:
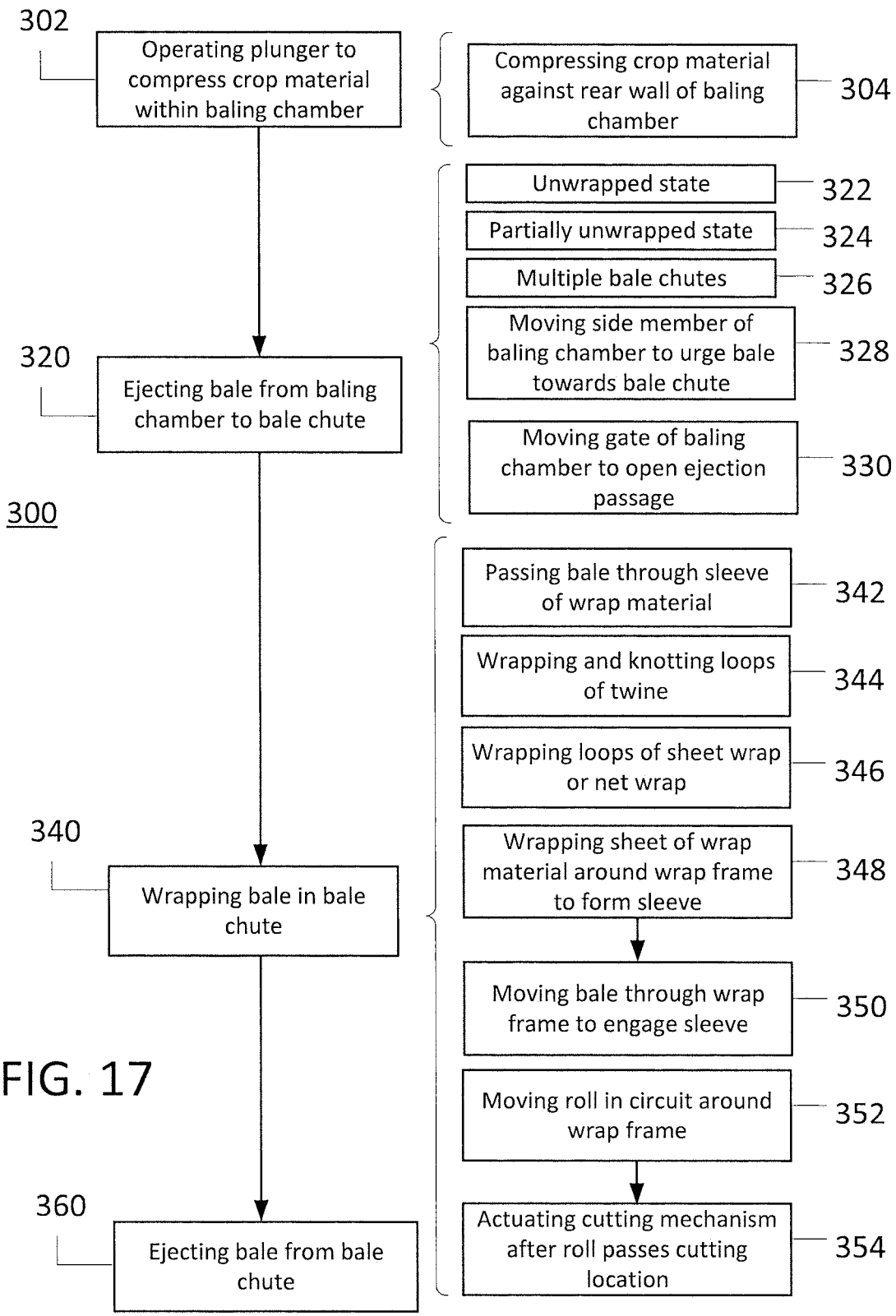
FIG. 17 is a diagrammatic view of a bale handling method that may be implemented by the balers of FIGS. 2-5 and 7-16.

Various baling and wrapping functionality, including various operations described above, may be executed as part of a baling and wrapping ("BW") method, which may be controlled, at least in part, by a controller of various configurations (e.g., one of the controllers 32, 112, or 172). Referring also to FIG. 17, for example, a controller may assist in execution of various operations of a BW method 300.

The BW method 300 may include operating 302 a plunger to compress crop material within a baling chamber. As described above, for example, the plungers 48 and 108 may be operated, respectively, to compress flakes 54 and 114 of crop material within the baling chambers 50 and 110. In certain embodiments, a crank arm (e.g., one of the crank arms 56 and 116) attached to either of the plungers 48 and 108 may be driven to rotate such that the plungers 48 and 108 execute a reciprocating motion with respect to the baling chambers 50 and 110. This motion may compress successively delivered flakes 54 and 114 into a bale within the respective baling chamber 50 or 110.

Figure 18:
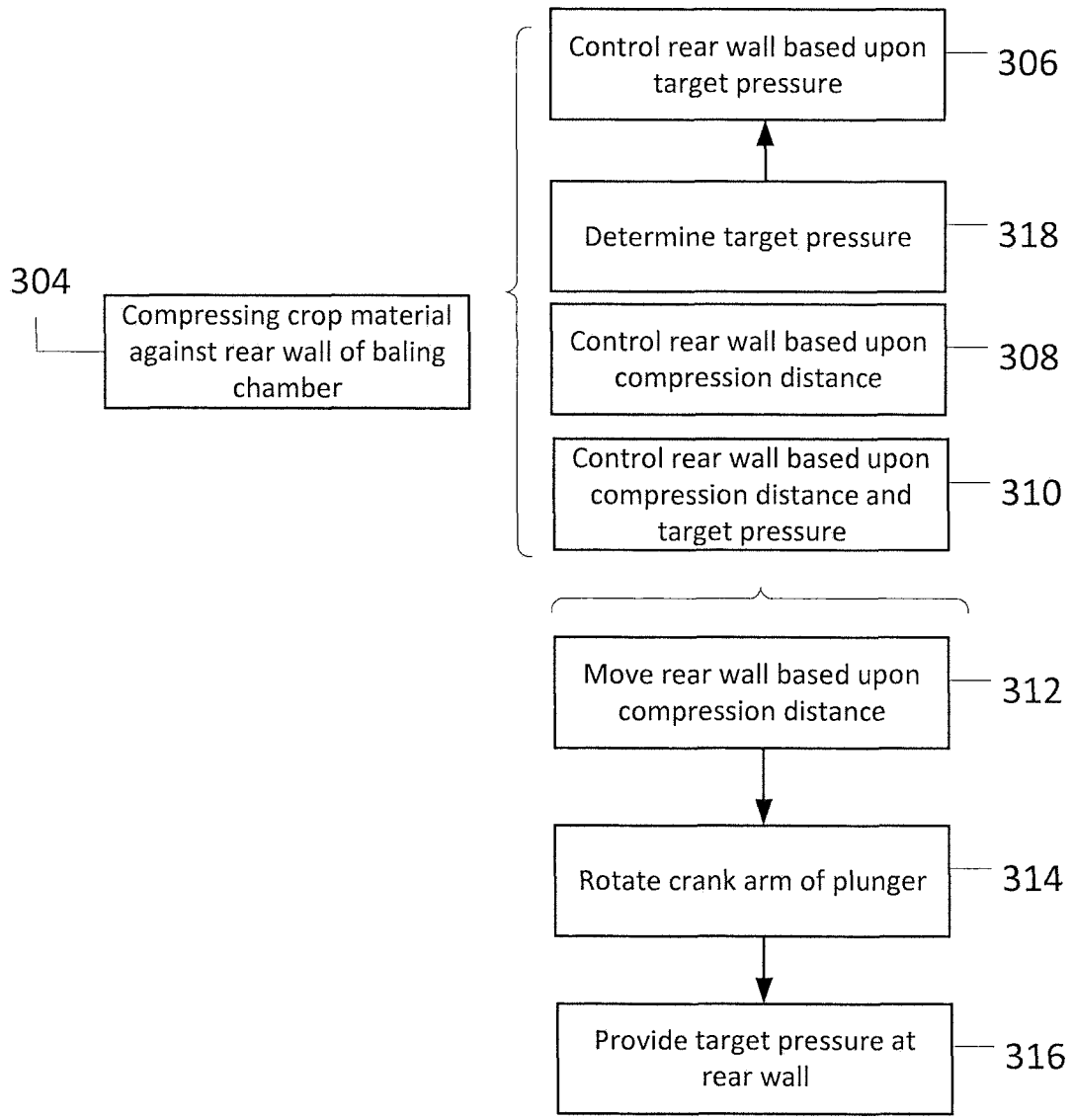
FIG. 18 is a diagrammatic view representing additional detail of certain operations represented in FIG. 17.

In certain embodiments, the relevant baling chamber may be a blind baling chamber with a rear wall, and the reciprocating motion of the plunger may compress 304 crop material against this rear wall. Referring also to FIG. 18, in such a case, the rear wall may be controlled in various ways. In certain implementations of the method 300, one or more actuators (e.g., hydraulic cylinders such as cylinders 74 and 128) may be provided to control 306 the rear wall based upon a target pressure. For example, a target compression pressure for the forming bale may be determined, and the appropriate actuator controlled (e.g., using, at least in part, an accumulator such as the accumulator 78) to provide the target pressure at the rear wall (e.g., by moving the rear wall to an appropriate orientation). In this way, crop material may be compressed between the plunger and the rear wall with the appropriate pressure.

In certain implementations, an actuator may be provided to control 308 the rear wall based upon a compression distance. For example, a target thickness of a particular flake after compression by the plunger may be determined, and the rear wall moved by the actuator in order to accommodate this compression.

In certain implementations, the rear wall of a baling chamber may be controlled 310 based upon both a target pressure and a compression distance. For example, for each cycle of the reciprocating piston, an actuator may be controlled to first move 312 the rear wall based upon a predetermined compression distance. The crank arm of the plunger may then be rotated 314 (or the plunger otherwise advanced in its cycle) and, after an appropriate interval (e.g., after the crank arm has reached an appropriate angle with respect to horizontal), an appropriate pressure may be provided 316 at the rear wall. In this way, for example, the plunger may initially compress flakes of crop material over the compression distance with relatively little resistance from the rear wall. As the rotation of the crank arm advances to provide increasing mechanical advantage (i.e., as the crank arm approaches alignment with the front-to-back path of the plunger), the rear wall may then be used to resist the plunger with a target pressure. This may result in efficient and effective compression of flakes into relatively highly compressed bales.

Referring again to FIG. 17, once a bale has been formed (e.g., by operation 302 of the plunger), the bale may be ejected 320 from the baling chamber to an adjacent bale chute. In certain implementations, the bale may be ejected in an unwrapped state 322. In certain implementations, the bale may be ejected in a partially unwrapped state 324, such that some amount of wrap material has been applied to the bale (e.g., within the baling chamber), but additional wrapping is needed before the bale is finally ejected from the baler. In certain implementations, multiple bale chutes 326 may be provided, with bales being alternately ejected 320 from the baling chamber to one of the multiple chutes 326.

A bale may be ejected 320 from the baling chamber in a variety of ways. In certain implementations, a side member (e.g., a side wall) of the baling chamber may be moved 328 to urge a bale from the baling chamber toward the appropriate bale chute. As described above, for example, a hydraulic cylinder may be utilized to actuate a moveable side wall of a baling chamber in order to push (or pull) a bale from the baling chamber to a particular bale chute. In certain implementations, a gate may be provided for the baling chamber, which gate may be moved 330 in order to open an ejection passage for ejection of the bale from the baling chamber.

Once ejected (in whole or in part) to a bale chute, a bale may be wrapped 340 with wrap material. As also described above, a bale may be wrapped 340 in a variety of ways, with a variety of wrapping devices, and with a variety of wrap material. In certain implementations, a bale may be passed 342 through a sleeve of wrap material supported at (or near) the relevant bale chute, such that the wrap material adheres to the bale and thereby appropriately wraps the bale. In certain implementations, loops of twine may be wrapped around a bale and knotted 344 by various wrapping (and tying) devices. In certain implementations, sheets of wrap material, such as net wrap or plastic sheeting, may be wrapped 346 around a bale.

In certain implementations, sheets of wrap material may be wrapped 348 around a wrap frame in order to form a sleeve, and a bale may be passed 350 through the wrap frame to engage the sleeve and thereby wrap the bale. For example, a tube- or tunnel-like wrap frame may be supported on a bale chute such that a bale ejected 320 from a baling chamber onto the bale chute passes into wrap frame. Various mechanisms may then (or previously) be used to wrap 348 sheets of wrap material around the wrap frame, such that a sleeve of the wrap material is formed around the wrap frame. Once an appropriate sleeve has been formed, the bale may then be moved 350 through the wrap frame such that the bale engages the sleeve and pulls the sleeve from the wrap frame. In this way, the bale may be wrapped by the formed sleeve of wrap material before the bale is fully ejected from the baler.

In certain implementations, sheet wrap may be wrapped 348 into a sleeve by moving 352 a roll of the sheet wrap in a circuit (e.g., a circular, rectangular or other path) around the wrap frame. Further, a cutting mechanism may be provided with a cutting location that is disposed such that the roll moves past the cutting location as the roll moves along the circuit. The cutting mechanism may then be actuated 354 to cut the sheet wrap from the roll after the roll has passed the cutting location. Referring again to FIG. 13, for example, as the roll 212 moves past the cutting location 232, a gap 230 may be temporarily provided between the sheet wrap 212a and the formed sleeve 224. The cutting mechanism 220 may be actuated 354 such that the cutting blade 226 moves into gap 230 to cut the sheet wrap 212a from the roll 212.

Once appropriately wrapped, a bale may be ejected 360 from the bale chute. In certain embodiments, a bale may be actively ejected 360 from a bale chute. For example, a side member of the baling chamber may push (or otherwise urge) a bale off of a bale chute directly, or may indirectly push a first bale off of the bale chute by pushing a second bale from the baling chamber onto the same bale chute. In certain embodiments, a bale may be passively ejected 360 from a bale chute. For example, a bale chute may be oriented at such an angle (or otherwise configured) that a bale moves off of the bale chute under the influence of gravity or with limited (or no) active engagement of the bale by a particular actuator.

As will be appreciated by one skilled in the art, various aspects of the disclosed subject matter may be embodied as a computer-implemented method, a system, or a computer program product. Accordingly, certain implementations may be implemented entirely as hardware, entirely as software (including firmware, resident software, micro-code, etc.) or as a combination of software and hardware aspects. Furthermore, certain implementations may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced implementations herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A method for forming and wrapping bales in a baler, the baler having a crop-moving device, a baling chamber, and a bale chute with a wrap frame oriented outside of the baling chamber, the method comprising:
operating the crop-moving device to compress crop material into a bale within the baling chamber;
ejecting the bale from the baling chamber to the bale chute;
wrapping a sheet of wrap material around the wrap frame, such that a sleeve of wrap material is formed from the sheet; and
moving the bale through the wrap frame, such that the bale engages the sleeve to pull the sleeve from the wrap frame;
wherein, when the bale is ejected from the bale chute, the bale is wrapped by the sleeve, and wherein the baling chamber further includes a moveable rear wall, the compressing of the crop material into the bale including the crop-moving device compressing crop material against the moveable rear wall; and during one or more operations of the crop-moving device, as the crop-moving device compresses crop material against the moveable rear wall, moving the rear wall with respect to the crop-moving device based upon, at least in part, a predetermined compression distance.

2. The method of claim 1, wherein the baling chamber is a blind baling chamber;
wherein the baling chamber further includes a side member; and
wherein the ejecting of the bale from the baling chamber includes moving the side member to urge the bale from the baling chamber towards the bale chute.

3. The method of claim 2, wherein the baling chamber further includes a gate, the method further comprising:
prior to the ejecting of the bale from the baling chamber, moving the gate to provide an ejection passage for the bale from the baling chamber to the bale chute;
wherein the ejecting of the bale from the baling chamber includes moving the bale through the ejection passage to the bale chute by, at least in part, the moving of the side member to urge the bale towards the bale chute.

4. The method of claim 2, wherein the side member is oriented at a first lateral side of the baling chamber as the crop-moving device compresses crop material into the bale;
wherein the bale chute is oriented outside the baling chamber along, at least in part, a second lateral side of the baling chamber that is opposite the first lateral side;
wherein the baler includes a second bale chute oriented outside the baling chamber along, at least in part, the first lateral side of the baling chamber; and
wherein the moving of the side member to urge the bale towards the bale chute includes moving the side member from the first lateral side of the baling chamber towards the second lateral side of the baling chamber;
the method further comprising:
with the side member oriented at the second lateral side of the baling chamber, after the moving of the side member to urge the bale towards the bale chute, operating the crop-moving device to compress crop material into a second bale within the baling chamber; and
ejecting the second bale, in an unwrapped state, from the baling chamber to the second bale chute by, at least in part, moving the side member from the second lateral side of the baling chamber towards the first lateral side of the baling chamber.

5. The method of claim 1, further comprising:
wrapping loops of twine around the bale and tying the loops with one or more knotter devices.

6. The method of claim 1, wherein the sheet of wrap material is provided for wrapping around the wrap frame from a roll of one or more of sheet wrap and net wrap; and
wherein the wrapping of the sheet of wrap material around the wrap frame includes moving the roll along a circuit around the wrap frame.

7. The method of claim 6, wherein the baler further includes a cutting mechanism disposed such that, as the roll moves once around the circuit, the roll moves past a cutting location for the cutting mechanism; and
wherein the method further includes actuating the cutting mechanism to cut the sheet of wrap material after the roll moves past the cutting location, with respect to the movement of the roll once around the circuit.

8. The method of claim 1, further comprising:
determining a target pressure for the moveable rear wall for the compressing of the crop material against the moveable rear wall by the crop-moving device; and
during one or more operations of the crop-moving device, as the crop-moving device compresses crop material against the moveable rear wall, controlling movement of moveable rear wall based upon, at least in part, the target pressure.

9. A baler comprising:
a baling chamber including a rear wall;
a crop-moving device configured to compresses crop material against the rear wall to form a bale within the baling chamber;
a bale chute with a wrap frame, wherein the bale chute is oriented outside the baling chamber;
an ejection actuator configured to eject the bale through a lateral side of the baling chamber to the bale chute; and
a wrapping device for wrapping a sheet of wrap material around the wrap frame, such that a sleeve of wrap material is formed from the sheet;
wherein, as the bale moves along the bale chute, the bale moves through the wrap frame and engages the sleeve to pull the sleeve from the wrap frame, such that when the bale is ejected from the bale chute, the bale is wrapped by the sleeve; and wherein the rear wall of the baling chamber is moveable with respect to the crop-moving device during one or more operations of the crop-moving device as the crop-moving device compresses crop material against the movable rear wall, the rear wall being moved with respect to the crop-moving device based upon, at least in part, a predetermined compression distance for the crop material.

10. The baler of claim 9, wherein the baling chamber further includes a side member, the side member being moveable by the ejection actuator to urge the bale from the baling chamber towards the bale chute during the ejecting of the bale from the baling chamber to the bale chute.

11. The baler of claim 10, wherein the baling chamber further includes a gate, the gate being movable to provide an ejection passage for the ejecting of the bale from the baling chamber to the bale chute; and
wherein the ejecting of the bale from the baling chamber to the bale chute includes, at least in part, moving the side member with the ejection actuator to urge the bale through the ejection passage.

12. The baler of claim 10, wherein the side member is oriented at a first lateral side of the baling chamber as the crop-moving device compresses crop material into the bale;
wherein the bale chute is oriented outside the baling chamber along, at least in part, a second lateral side of the baling chamber that is opposite the first lateral side;
wherein the baler includes a second bale chute oriented outside the baling chamber along, at least in part, the first lateral side of the baling chamber;
wherein the moving of the side member to urge the bale towards the bale chute includes moving the side member from the first lateral side of the baling chamber towards the second lateral side of the baling chamber;
wherein, with the side member oriented at the second lateral side of the baling chamber, after the moving of the side member to urge the bale towards the bale chute, the crop-moving device compresses crop material against the rear wall to form a second bale within the baling chamber; and
wherein the second bale, in an unwrapped state, is ejected from the baling chamber to the second bale chute by, at least in part, moving the side member from the second lateral side of the baling chamber toward the first lateral side of the baling chamber.

13. The baler of claim 9, wherein the sheet of wrap material is provided for wrapping around the wrap frame from a roll of one or more of sheet wrap and net wrap; and
wherein the wrapping of the sheet of wrap material around the wrap frame includes moving the roll in a circuit around the wrap frame.

14. The baler of claim 9, wherein the rear wall of the baling chamber is moveable during one or more operations of the crop-moving device as the crop-moving device compresses crop material against the moveable rear wall, the rear wall being moved based upon, at least in part, a predetermined target pressure for the crop material.

15. A baler comprising:
- a baling chamber for compressing crop material into successively formed bales within the baling chamber, the baling chamber including a side member movable laterally within the baling chamber;
- a first bale chute with a first wrap frame, wherein the first bale chute is oriented outside the baling chamber along, at least in part, a first lateral side of the baling chamber;
- a second bale chute with a second wrap frame, wherein the second bale chute is oriented outside the baling chamber along, at least in part, a second lateral side of the baling chamber, the second lateral side being opposite the first lateral side;
- one or more ejection actuators configured to eject the bales from the baling chamber to either of the first and second bale chutes by moving the side member of the baling chamber laterally across the baling chamber;
- a first wrapping device for wrapping a first sheet of wrap material around the first wrap frame, such that a first sleeve of wrap material is formed from the first sheet; and
- a second wrapping device for wrapping a second sheet of wrap material around the second wrap frame, such that a second sleeve of wrap material is formed from the second sheet;
- wherein the one or more ejection actuators are configured to eject a first bale from the baling chamber to the first bale chute by moving the side member of the baling chamber from the second lateral side of the baling chamber toward the first lateral side of the baling chamber;
- wherein the one or more ejection actuators are configured to eject a second bale from the baling chamber to the second bale chute by moving the side member of the baling chamber from the first lateral side of the baling chamber toward the second lateral side of the baling chamber;
- wherein as the first bale moves along the first bale chute, the first bale moves through the first wrap frame and engages the first sleeve to pull the first sleeve from the first wrap frame, such that when the first bale is ejected from the first bale chute, the first bale is wrapped by the first sleeve; and
- wherein as the second bale moves along the second bale chute, the second bale moves through the second wrap frame and engages the second sleeve to pull the second sleeve from the second wrap frame, such that when the second bale is ejected from the second bale chute, the second bale is wrapped by the second sleeve.

16. The baler of claim 15, wherein the first and second sheets of wrap material are provided for wrapping around the first and second wrap frames, respectively, from first and second rolls of one or more of sheet wrap and net wrap; and
- wherein the wrapping of the sheet of wrap material around the first and second wrap frames includes, respectively, moving the first and second rolls in first and second circuits around the first and second wrap frames.

17. The baler of claim 16, further comprising first and second cutting mechanisms;
- wherein, as the first and second rolls move once along the respective first and second circuits, the first and second rolls move past, respectively, first and second cutting locations for the first and second cutting mechanisms; and
- wherein the first and second cutting mechanisms are configured to cut the first and second sheets of wrap material, respectively, after the first and second rolls move past the first and second cutting locations, with respect to movement of the first and second rolls once around the respective first and second circuits.

\* \* \* \* \*